US010827344B2

(12) United States Patent
Gupta

(10) Patent No.: US 10,827,344 B2
(45) Date of Patent: Nov. 3, 2020

(54) MULTEFIRE ARCHITECTURE FOR CELLULAR INTERNET-OF-THINGS (CIOT)

(71) Applicant: Apple Inc., Cupertino, CA (US)

(72) Inventor: Vivek Gupta, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/499,016

(22) PCT Filed: Apr. 13, 2018

(86) PCT No.: PCT/US2018/027513
§ 371 (c)(1),
(2) Date: Sep. 27, 2019

(87) PCT Pub. No.: WO2018/200218
PCT Pub. Date: Nov. 1, 2018

(65) Prior Publication Data
US 2020/0120475 A1 Apr. 16, 2020

Related U.S. Application Data

(60) Provisional application No. 62/489,081, filed on Apr. 24, 2017.

(51) Int. Cl.
H04W 4/00 (2018.01)
H04W 8/06 (2009.01)
(Continued)

(52) U.S. Cl.
CPC ............ H04W 8/06 (2013.01); H04W 4/70 (2018.02); H04W 16/14 (2013.01); H04W 76/12 (2018.02); H04W 88/02 (2013.01); H04W 92/24 (2013.01)

(58) Field of Classification Search
CPC .................. H04W 16/14; H04W 84/12
See application file for complete search history.

(56) References Cited

U.S. PATENT DOCUMENTS

2018/0324652 A1* 11/2018 Ryu ................... H04W 8/08
2020/0022008 A1* 1/2020 Magee ............... H04W 8/20

FOREIGN PATENT DOCUMENTS

EP         2713664 A1    4/2014
WO    WO-2018200218 A1  11/2018

OTHER PUBLICATIONS

"International Application Serial No. PCT/US2018/027513, International Search Report dated Aug. 13, 2018", 3 pgs.
(Continued)

Primary Examiner — Omoniyi Obayanju
(74) Attorney, Agent, or Firm — Kowert, Hood, Munyon, Rankin & Goetzel, P.C.

(57) ABSTRACT

An apparatus of a MulteFire (MF) user equipment (MF UE) includes processing circuitry to configure the MF UE to implement a Reliable Data Service (RDS) protocol. To implement the RDS protocol, the processing circuitry encodes an Attach Request message for transmission in an unlicensed band to a Neutral Host Mobility Management Entity in a Neutral Host Network (NHN). The Attach Request message can include a Packet Data Network (PDN) Connectivity Request message for establishing a PDN connection with a Service Capability Exposure Function (SCEF) via a Interworking-SCEF (IWK-SCEF). A configuration message from the SCEF can be decoded, which indicates acceptance of non-Internet Protocol (IP) data communication via the PDN connection, using the RDS protocol. In response to the configuration message, an RDS frame is encoded (as part of user data transmission over control plane) for transmission to the SCEF via the IWK-SCEF using the PDN connection in the unlicensed band.

20 Claims, 20 Drawing Sheets

(51) Int. Cl.
*H04W 76/12* (2018.01)
*H04W 4/70* (2018.01)
*H04W 16/14* (2009.01)
*H04W 88/02* (2009.01)
*H04W 92/24* (2009.01)

(56) References Cited

OTHER PUBLICATIONS

"International Application Serial No. PCT/US2018/027513, Written Opinion dated Aug. 13, 2018", 5 pgs.
"Introduction of non-IP data delivery via the SCEF for cellular IoT", S2-160423, 3GPP TSG SA WG2 Meeting #113, Saint Kitts, KN, (Jan. 19, 2016), 10-14.
Huawei, et al., "Clarification of informing the HSS about the result of a configuration when an IWK-SCEF is involved", S2-162011, 3GPP TSG SA WG2 Meeting #114, (Apr. 16, 2016), 3-6.
Samsung, et al., "Introduction of non-IP data delivery via the SCEF for cellular IoT", S2-154310, 3GPP TSG SA WG2 Meeting #112, (Nov. 23, 2015), 10-15.
Samsung, "Monitoring event cancellation in the IWK-SCEF due to UE mobility", S2-154041, 3GPP TSG SA WG2 Meeting #112, (Nov. 12, 2015), 2, 3.

\* cited by examiner

MULTEFIRE ARCHITECTURE FOR CELLULAR INTERNET-OF-THINGS (CIOT)

PRIORITY CLAIM

This application is a U.S. National Stage Filing under 35 U.S.C. 371 from International Application No. PCT/US2018/027513, filed on Apr. 13, 2018, which claims the benefit of priority to U.S. Provisional Patent Application Ser. No. 62/489,081, filed Apr. 24, 2017, and entitled "MULTE-FIRE ARCHITECTURE FOR CELLULAR INTERNET OF THINGS (CIOT)," each of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to MulteFire networks. Additional aspects are directed to a MulteFire architecture for Cellular Internet-of-Things (CIoT) networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

The use of networked UEs using 3GPP LTE systems has increased in areas of home and work life. Fifth generation (5G) wireless systems are forthcoming, and are expected to enable even greater speed, connectivity, and usability. Next generation 5G networks are expected to increase throughput, coverage, and robustness and reduce latency and operational and capital expenditures. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Further enhanced operation of LTE systems in the licensed as well as unlicensed spectrum is expected in future releases and 5G systems.

Machine Type Communications (MTC), such as Machine-to-Machine (M2M) communications, as well as IoT communications, represent a significant growth opportunity for 3GPP ecosystems. With proliferation of the wireless networks, there is an accelerated push towards connected, smart physical objects, such as wireless sensors, smart meters, dedicated microprocessors, etc., that span different ecosystems with diverse business models. In this regard, various data delivery mechanisms can be deployed within a dense communication environment.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
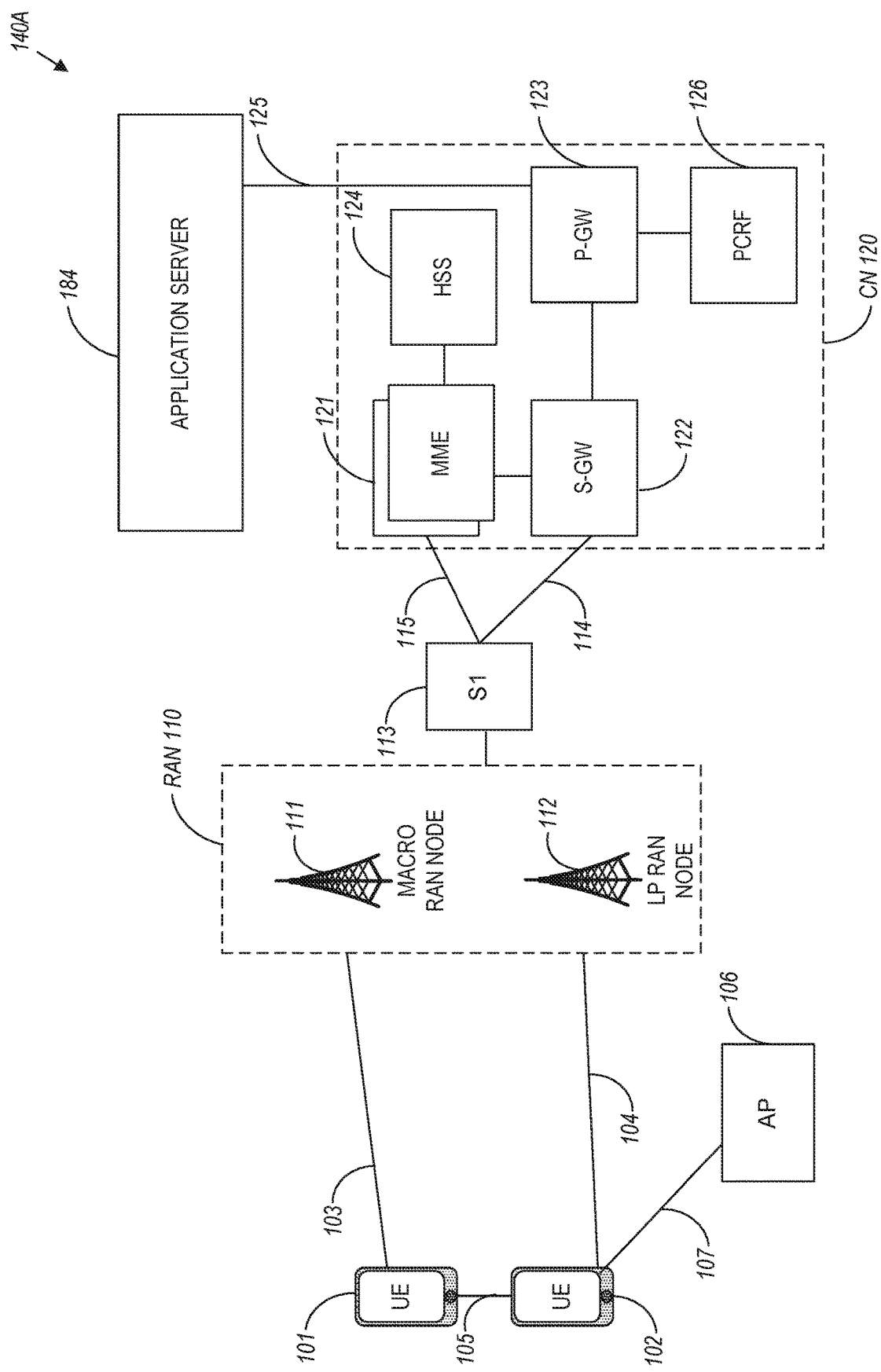
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UNITS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UNITS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), our (Norwegian for Offentlig Landmobil Telefoni, Public Land. Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive a transmit data.

In some aspects, any of the UEs 101 and 102 can include enhanced MTC (eMTC) UEs or further enhanced. MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, RAN 110 can include NG RAN or NG Core RAN. The RAN 110 can include various functions, such as, for example, an access and mobility management function (AMF), a session management function (SMF), a user plane function (UPF), a policy control function (PCF), a unified data management (UDM) function, and a network function (NF) repository function (NRF). The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system). Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The LIE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1E). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data. Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. Generally, the application server 184 may be an element offering applications that use IP bearer resources with the core network (e.g., UNITS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UEs Internet Protocol Connectivity Access Network (IP-CAN) session. In a roaming scenario with local breakout of traffic, there may be two PCRFs associated with a UEs IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PDSCH) as well as for sounding reference signal (SRS) transmission.

Figure 1B:
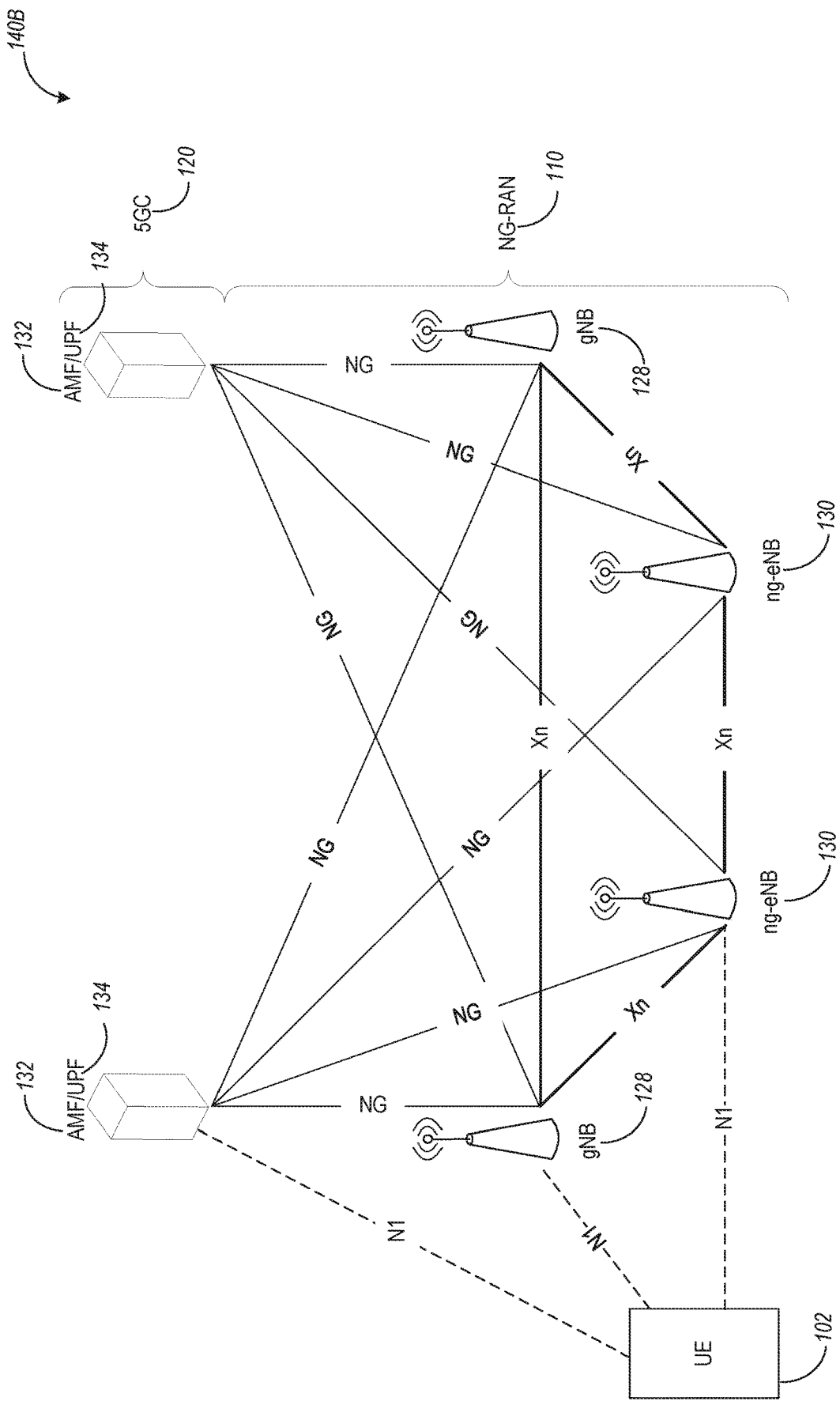
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via. Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
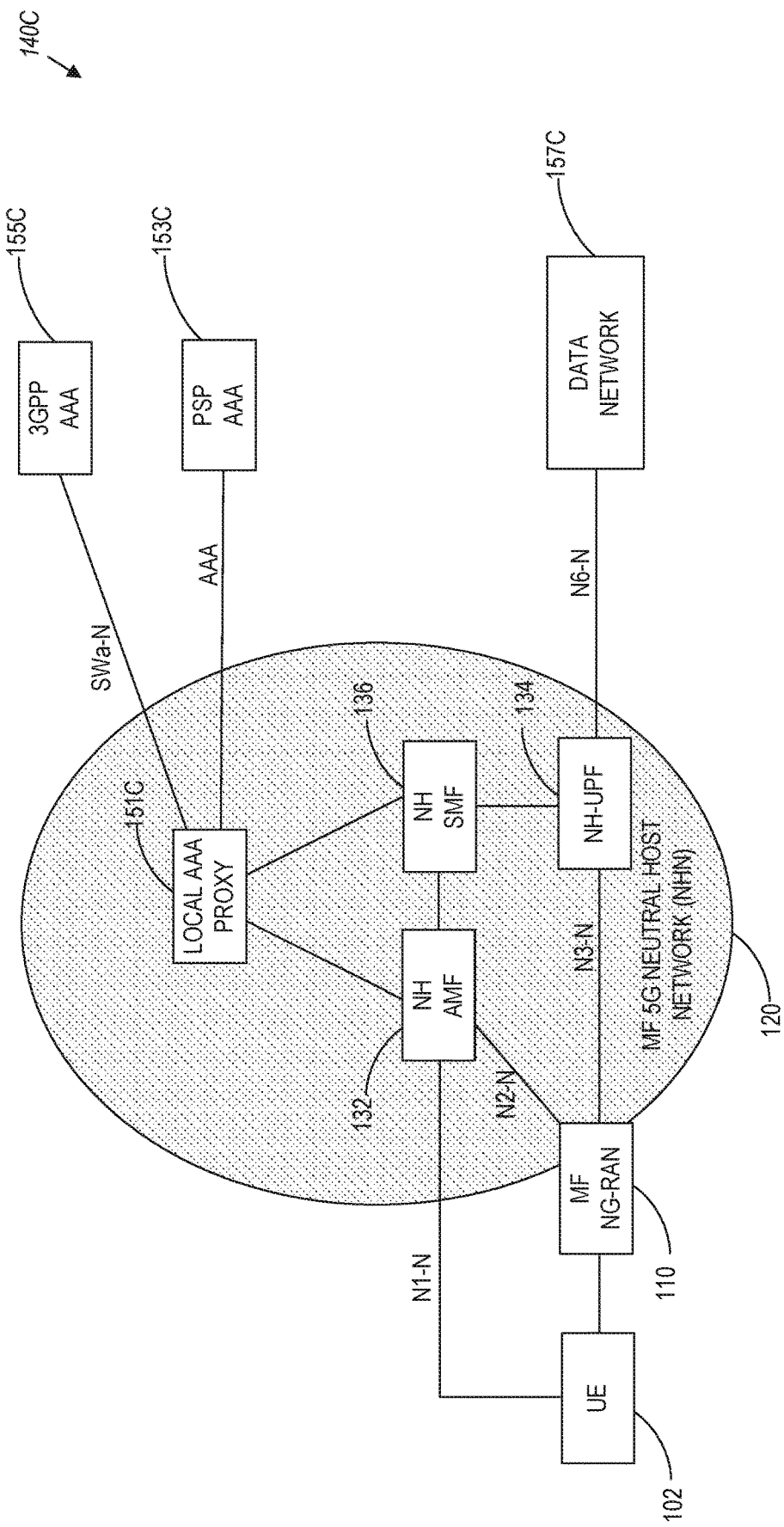
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the ME NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
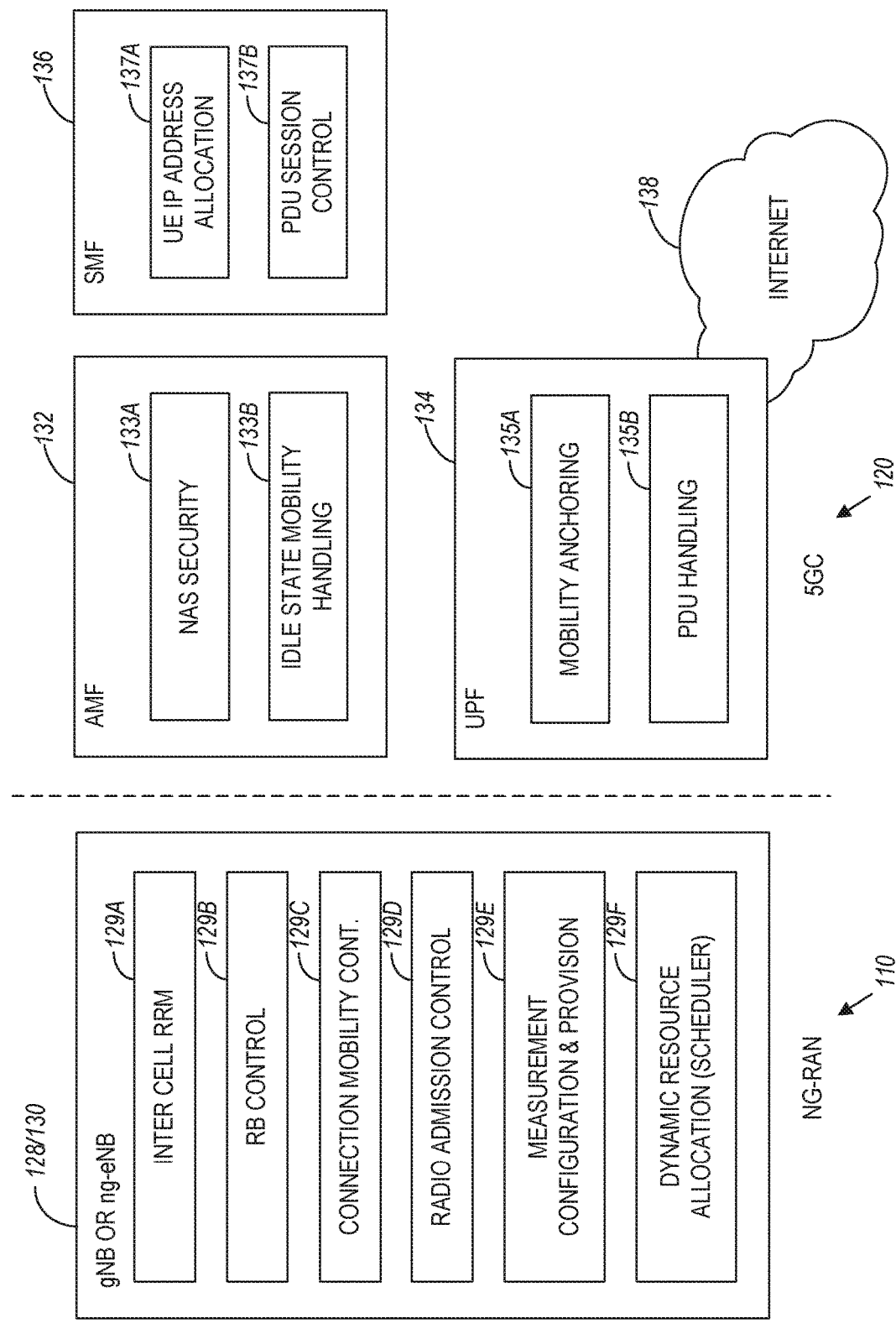
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, connection mobility control 129C, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratus (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratus (AS) security control; inter core network (CN) node signaling for mobility between 3GPP access networks; idle state mode mobility handling 1339, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-horned PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SW) 136 can be configured to host the following functions, for example: session management; UE IP address allocation and management 137A; selection and control of UP function; PDU session control 137B, including configuring traffic steering at UPF 134 to route traffic to proper destination; control part of policy enforcement and QoS; and/or downlink data notification, among other functions.

Figure 1E:
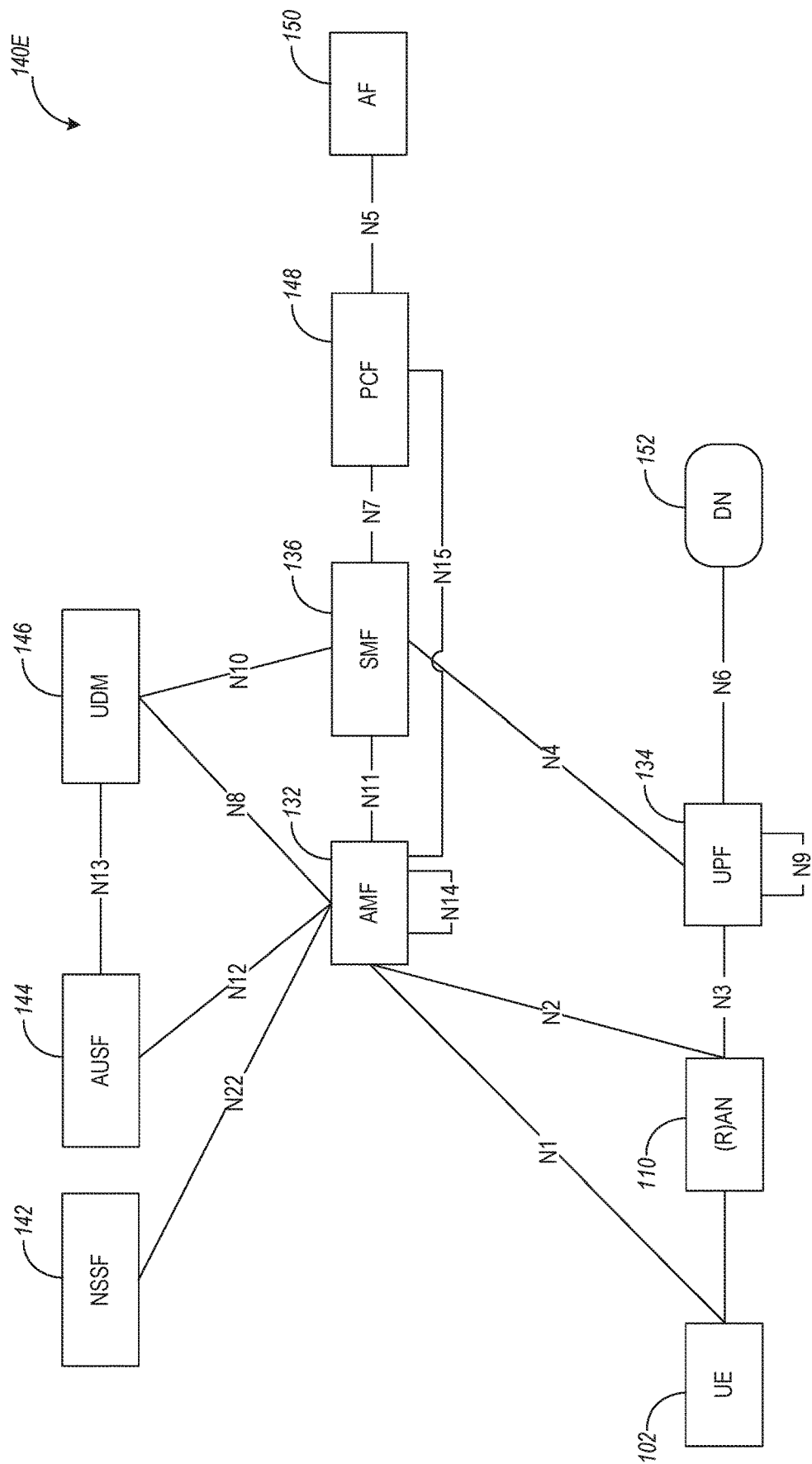
FIG. 1E and FIG. 1F illustrate a non-roaming 5G system architecture in accordance with some aspects.
Figure 1F:
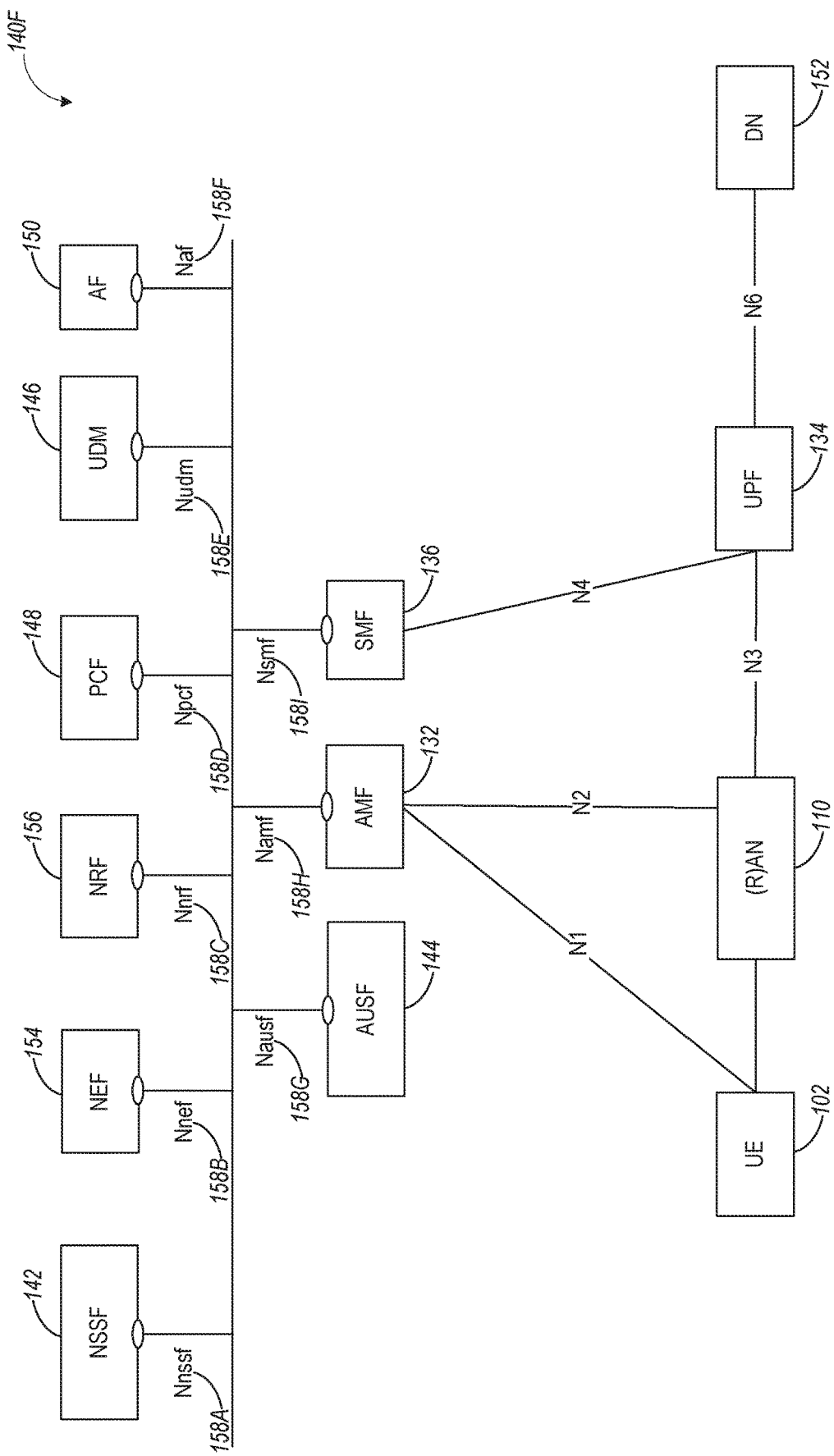

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5GC network entities. The 5GC system architecture 140D includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM) 146. The UPF 134 can provide a connection to a data network (DN) 152, which can include, for example, operator services, Internet access, or third-party services.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1D), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
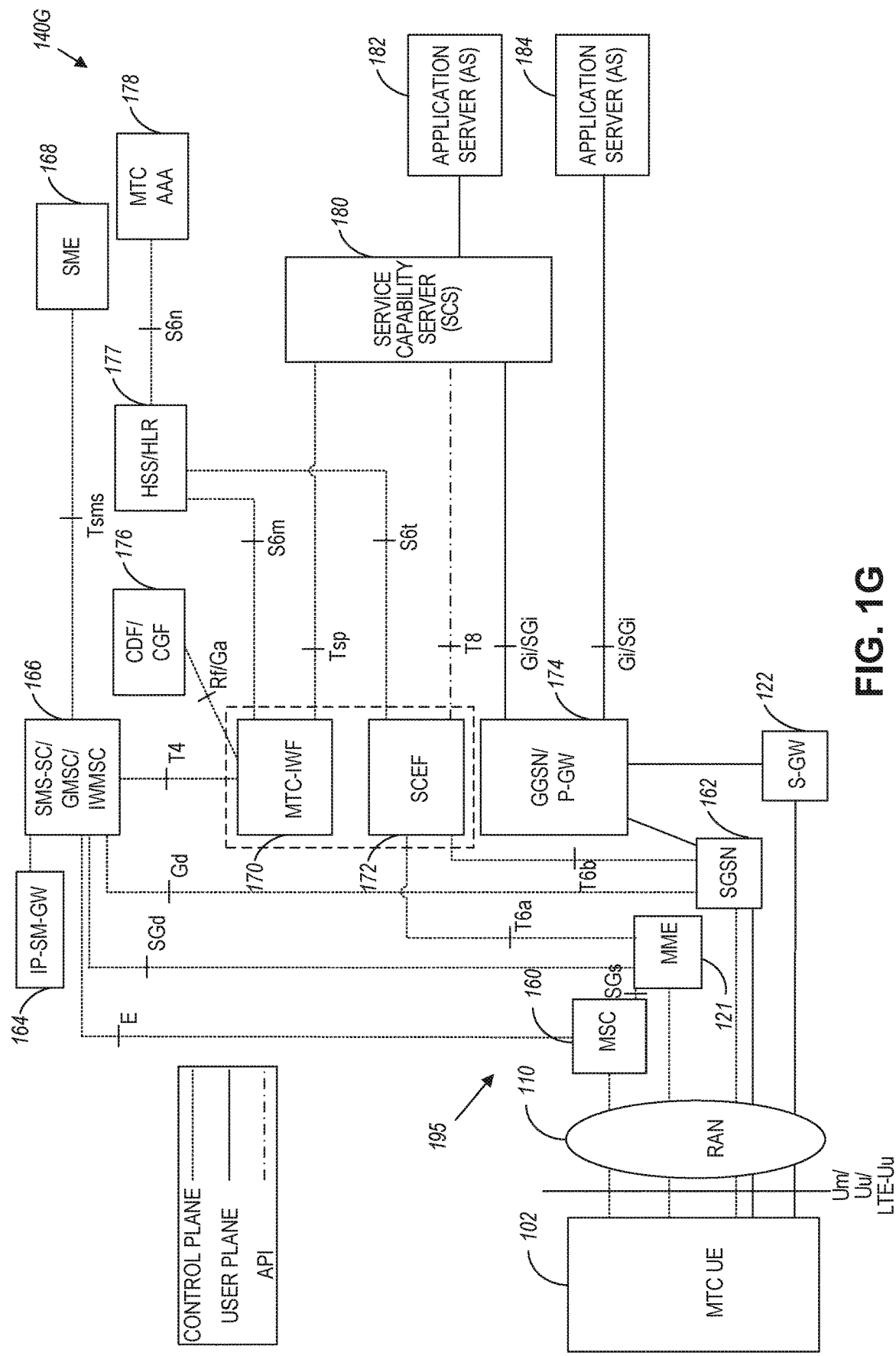
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Patent-GW 174, a charging data function (CDF)/charging gateway function (CGF) 176, a home subscriber server (HSS)/a home location register (FILR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the MT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HER 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as MT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., MT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
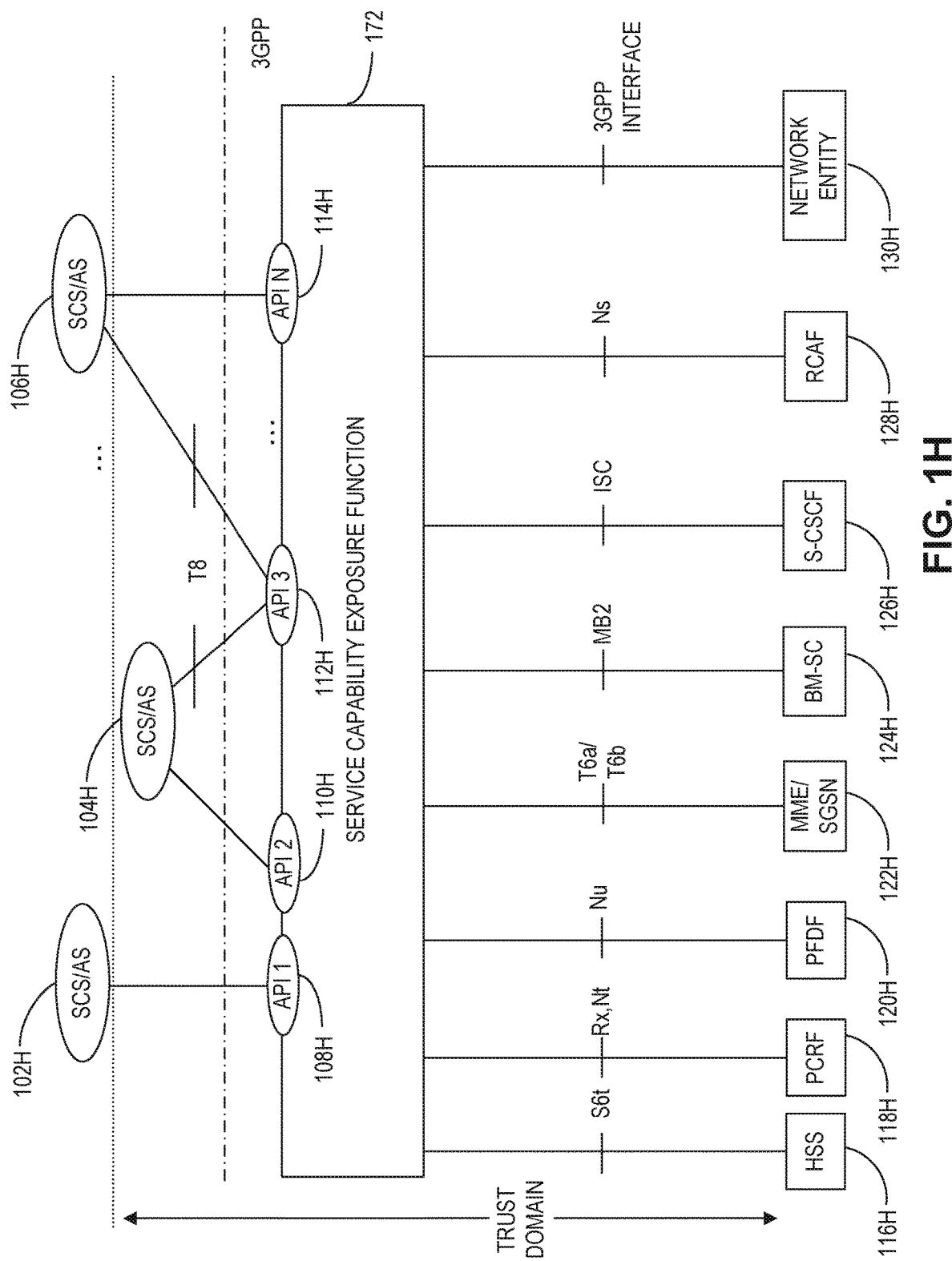
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the MT architecture 140G, can expose the following services and capabilities: a home subscriber server (HSS) 116H, a policy and charging rules function (PCRF) 118H, a packet flow description function (PFDF) 120H, a MMF/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
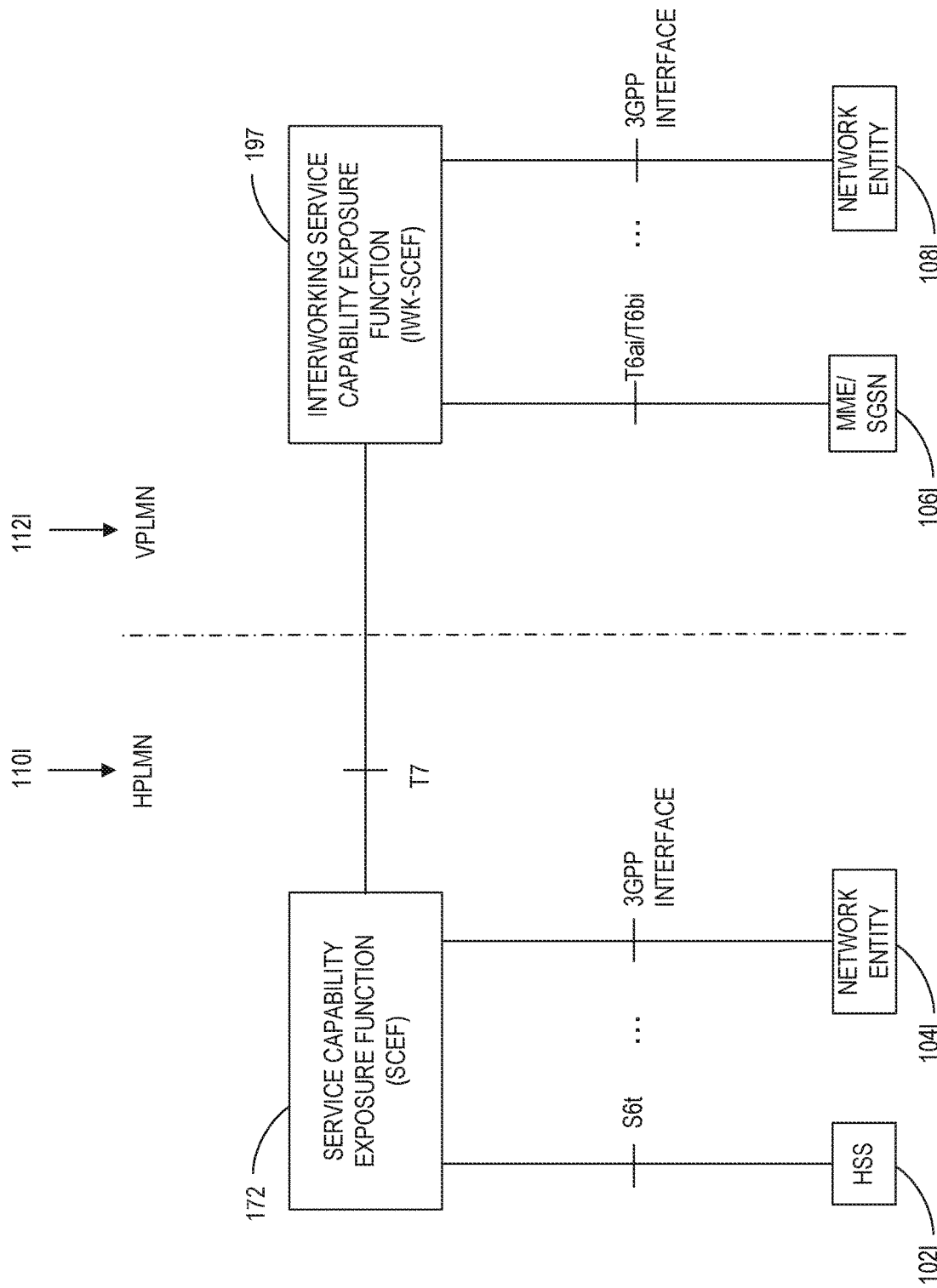
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 2:
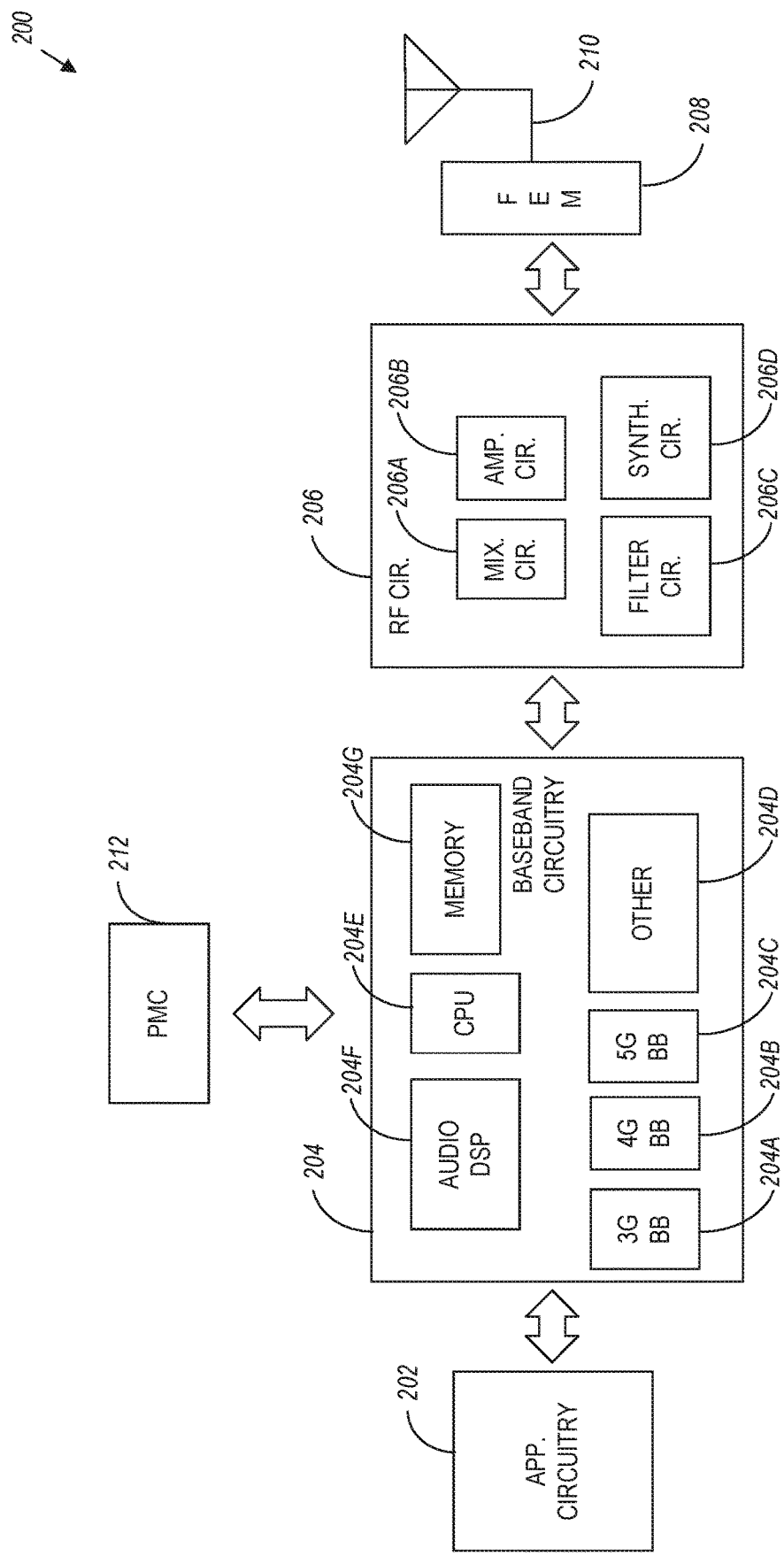
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206AA. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
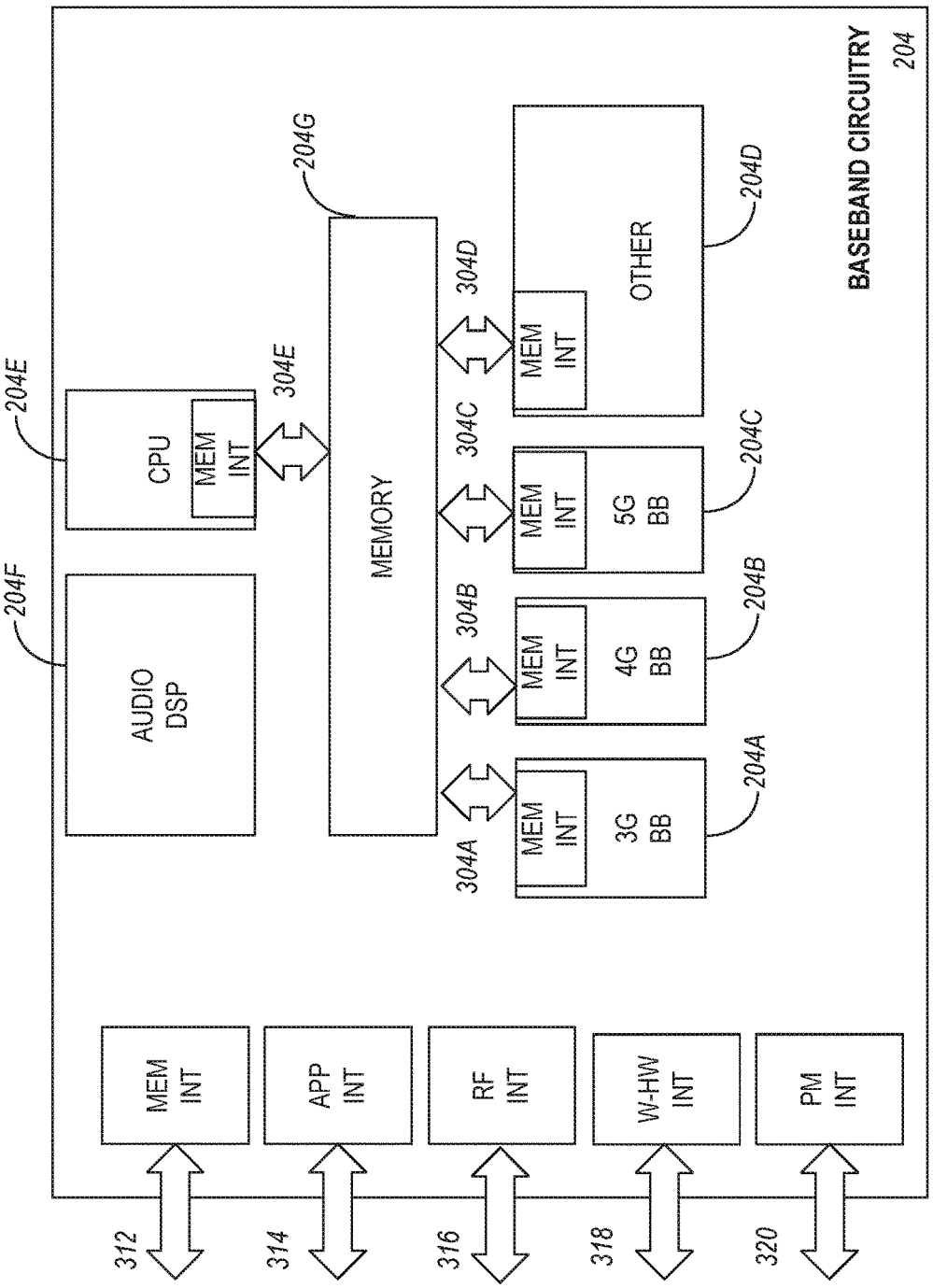
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 101 (or alternatively, the UE 102), the RAN node 111 (or alternatively, the RAN node 112), and the MME 121.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also in some aspects execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging, establishment, maintenance, and release of an RRC connection between the UE and E-UTRAN (e.g., RRC connection paging, RRC connection establishment, RRC connection modification, and RRC connection release); establishment, configuration, maintenance, and release of point-to-point Radio Bearers; security functions including key management, inter-radio access technology (RAT) mobility; and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121 as illustrated in FIG. 4. In aspects, the NAS protocols 406 support the mobility of the LIE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. In certain aspects, the S1-AP layer 415 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (which may alternatively be referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node 111 and the MME 121 to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
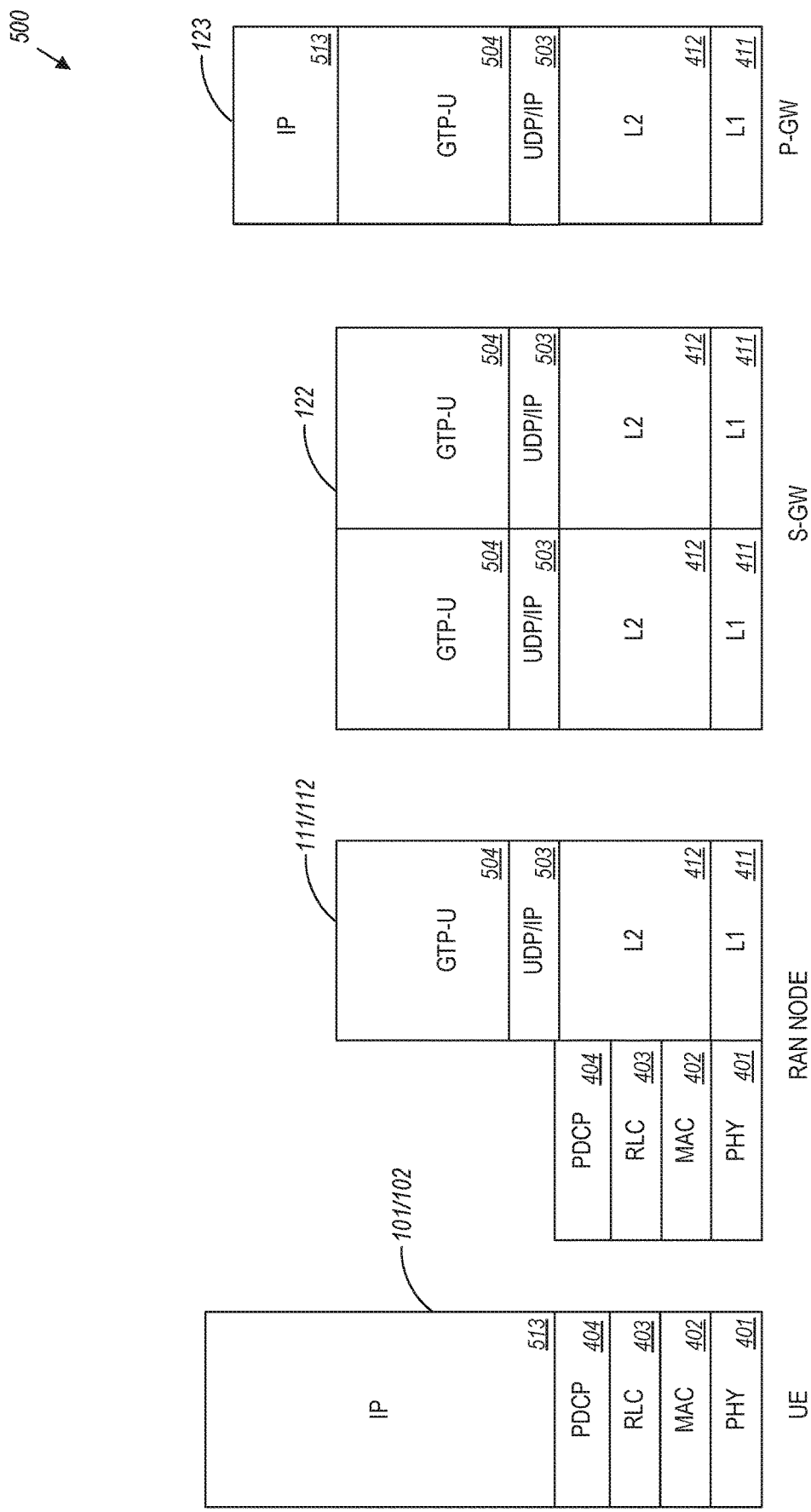
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
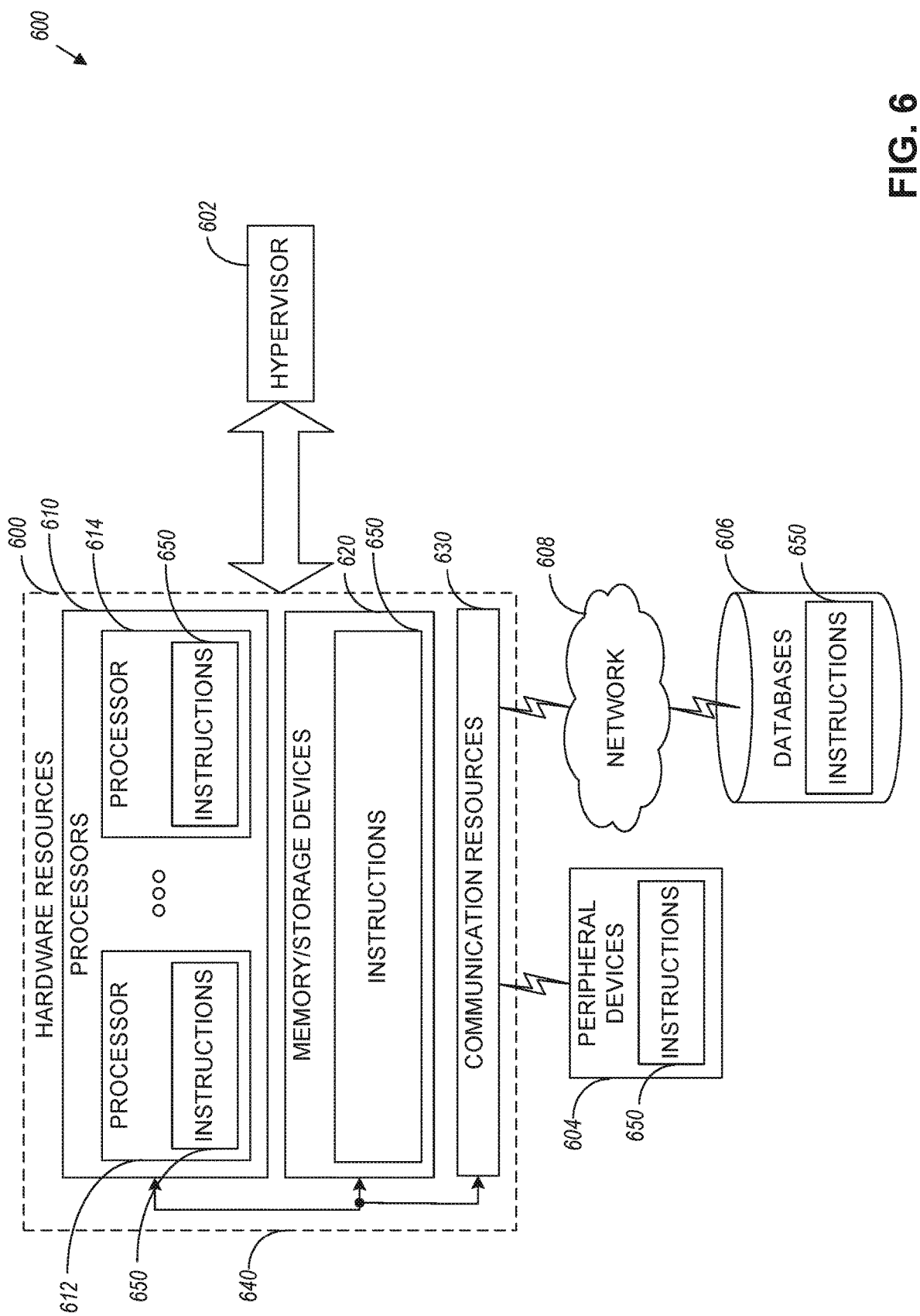
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an apples, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
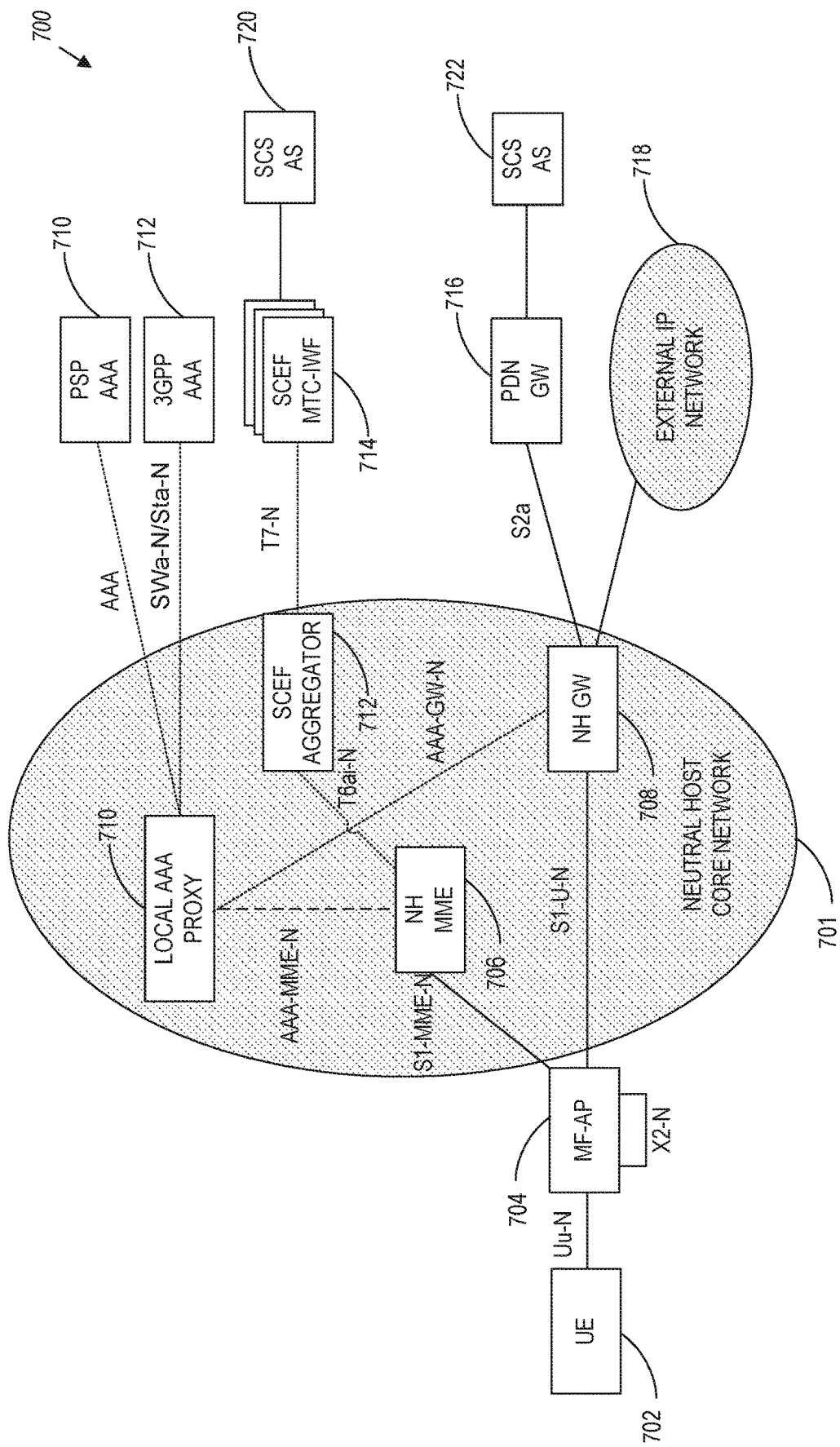
FIG. 7 is an illustration of a general MulteFire architecture using a neutral host network (NHN), in accordance with some aspects.

FIG. 7 is an illustration of a general MulteFire architecture 700 using a neutral host network (NHN) in accordance with some aspects.

In some aspects, a MulteFire architecture such as architecture 700 in FIG. 7, is configured to operate in an unlicensed spectrum and can be deployed in a venue or public space over a large area (e.g. a smart city, malls, libraries, trains, etc.) or in an office environment for enterprise-specific services, for providing services to subscribers of multiple mobile network operators (MNOs) (e.g., as Neutral Host/DAS replacement) or in homes and residential areas. In some aspects, the MulteFire architecture 700 can be configured to operate in connection with industrial automation applications and Internet-of-Things (IoT) applications.

In some aspects, the MulteFire architecture 700 can provide support for one or more IoT features, such as integrating the SCEF within the MulteFire architecture and enabling additional SCEF-related features (e.g., device triggering, event monitoring, enhanced coverage restriction control, non-IP data delivery, group message delivery, and so forth).

In some aspects, techniques disclosed herein can be used in connection with the following example functionalities related to a MulteFire architecture: integration of SCEF to MulteFire neutral host network (NHN) architecture for MNOs, MSOs, and independent PSPs; support for monitoring events; non-IP data delivery (NIDD); and device triggering using non-IP data delivery.

Referring to FIG. 7, the MulteFire architecture 700 can include a MulteFire UE (ME UE) 702 coupled to a Multe-Fire access point (ME AP) 704. The ME UE 702 can be configured to support functions needed to use a MulteFire network.

The MF AP 704 can access a neutral host network (NHN) 701, which can include a neutral host MME (NH MME) 706, a neutral host gateway (NH GW) 708, and accounting, authorization and authentication (AAA) proxy 710, and an SCEF aggregator 712.

In some aspects, the NH MME 706 can be configured to provide similar functionality as an MME in enhanced packet core EPC (e.g., MME 121 in FIG. 1A).

In some aspects, the NH GW 708 can be configured to provide similar functionality as a combined SGW/PGW for non-EPC routed PDN connections. For EPC Routed PDN connections, NH GW 708 functionality can be similar to a SGW in interactions with the MF-APs over the S1 interface and is similar to the TWAG in interactions with the PLMN PDN-GWs over the S2a-N interface.

In some aspects, the local AAA proxy 710 can be configured to provide AAA functionalities used for interworking with a participating service provider AAA (PSP AAA) server 710 and 3GPP AAA server 712. The PSP AAA server 710 can include a server using non-USIM credentials that is associated with the PSP, and may be either internal or external to the NHN 701.

The SCEF aggregator 712 can be configured to perform interworking SCEF (IWK SCEF) functions and integration functions for the SCEF/MTC-IWK 714 (which can include multiple servers as illustrated in FIG. 7). The SCEF/MTC-IWF 714 can be configured to expose functionalities of the NHN 701 to one or more applications running on the service capabilities server (SCS)/application server (AS) 720. The SCEF/MTC-IWF 714 can be deployed outside a 3GPP PLMN and can be configured to exchange information with the PSP AAA 710 or the subscriber database used by the PSP AAA (e.g. retrieve subscriber information).

In some aspects, the SCEF aggregator 712 can be configured to receive monitoring event reports from the underlying entities and send them to the SCEF 714. The SCEF aggregator 712 can be configured to relay the non-IP data between the NH MME 706 and the SCEF 714. The functionality of the SCEF aggregator 712 may also include the following functionalities: normalization of reports according to roaming agreement between VPLMN and HPLMN, e.g. change the location granularity of monitoring event reports received from the underlying entities, and generation of charging/accounting information. In connection with the generation of charging/accounting information, the SCEF aggregator 712 can be configured to receive the monitoring configuration information as well as the monitoring event report from the underlying nodes, as well as receive the NIDD charging ID from the SCEF during a connection establishment procedure.

The NH GW 708 within the NHN 701 can be used for providing connections to an external IP network 718 as well as to a PDN gateway (PDN GW) 716 coupled to an SCS AS 722. The PDN GW 716 can be a gateway in the PLMN core network, which can terminate an SGi interface towards the PDN.

In some aspects, the following aspects can be considered when integrating the SCEF functionality in the MulteFire architecture 700:

(a) in some aspects, the MulteFire architecture 700 can be configured to support integration of multiple SCEFs from different service providers, including mobile network operators, cable operators, aggregators, mobile system operators and venue owners, and thus scale to multiple implementation scenarios;

(b) In some aspects, the MulteFire architecture 700 can be configured to aggregate and consolidate functionalities across different SCEFs;

(c) In some aspects, various interfaces used within the MulteFire architecture 700 can be similar to interfaces used in other 3GPP architectures;

(d) In some aspects, non-IP data delivery (NIDD) can be supported using both SCEF and SGi interfaces;

(e) In some aspects, the MulteFire architecture 700 can be configured to support a Reliable Data Service (RDS) protocol for communication between the ME UE 702 and the SCEF 714, providing reliable data delivery with acknowledgement on a per packet basis.

The SCEF 714 can be a trusted entity and can be located within the trust domain of MF network. The SCEF 714 can be configured to abstract services from underlying 3GPP network interfaces and protocols, and also can include the ability for external entities to discover exposed service capabilities. The IWK SCEF is typically an optional entity within a 3GPP architecture and can be located within the VPLMN. Additionally, the IWK-SCEF can perform aggregator functions, such as aggregating monitoring reports and communicating the aggregated monitoring reports to the SCEF 714. The IWK SCEF can also be configured to relay non-IP data between the NH MME 706 and the SCEF 714.

Figure 8:
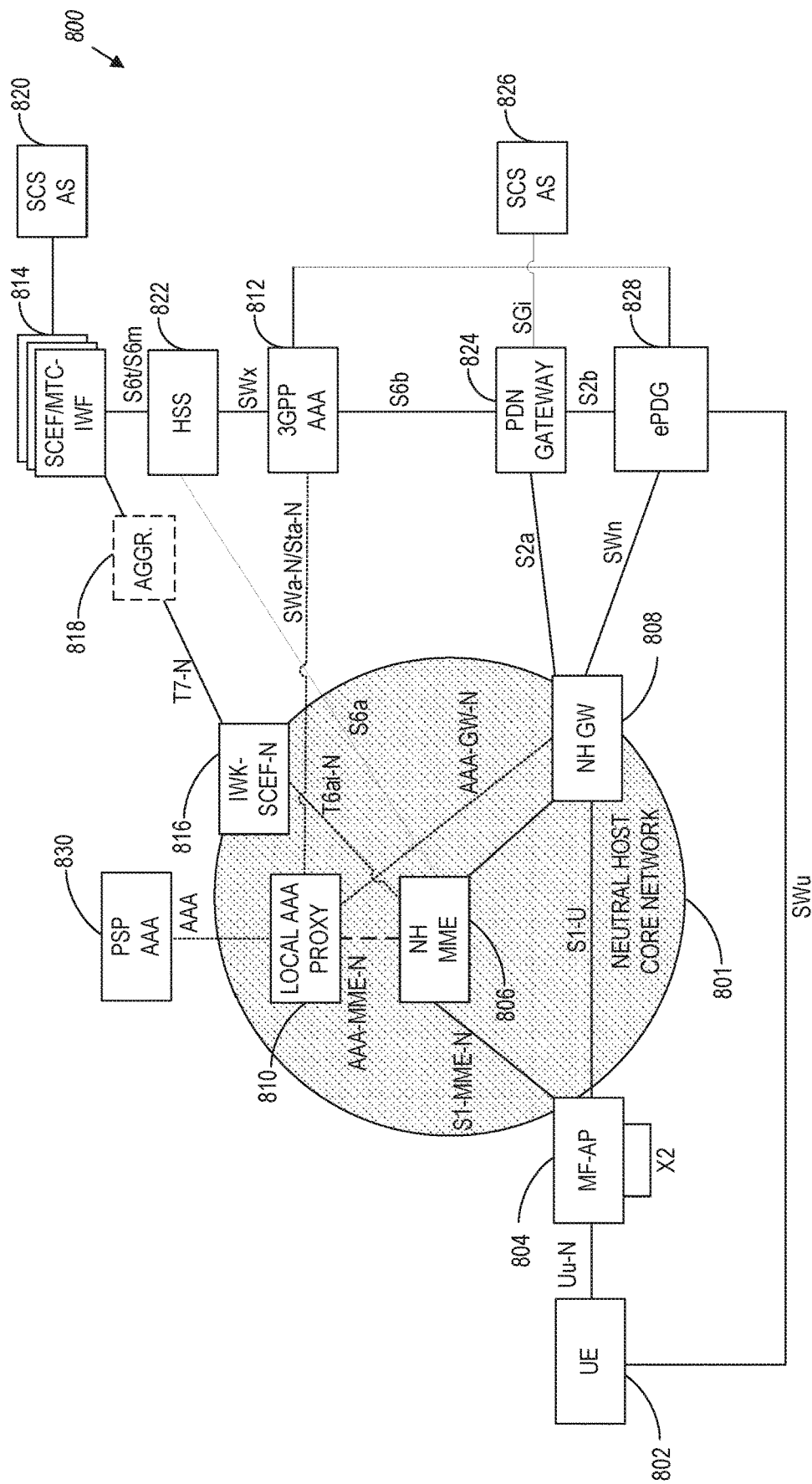
FIG. 8 is an illustration of a MulteFire architecture with an SCEF integrated in the participating service provider (PSP) domain, in accordance with some aspects.

FIG. 8 is an illustration of a MulteFire architecture with an SCEF integrated in the participating service provider (PSP) domain, in accordance with some aspects. Referring to FIG. 8, the MulteFire architecture 800 can include a ME UE 802 coupled to a MF AP 804. The MF AP 804 can access a NHN 801, which can include a NH MIME 806, a NH GW 808, a local AAA proxy 810, and an IWK. SCEF 816. The AAA proxy 810 can be coupled to the PSP AAA server 830. The functionalities of elements 802, 804, 806, 808, and 810 can be similar to the above-described functionalities of corresponding elements 702, 704, 706, 708, and 710 (in FIG. 7), respectively.

The NH GW 808 within the NHN 801 can be used for providing connections to an evolved packet data gateway (ePDG) 828 as well as to a PDN gateway (PDN GW) 824 coupled to an SCS AS 826. The PDN GW 824 can be a gateway in the PLMN core network, which can terminate an SGi interface towards the PDN.

In some aspects and as seen in FIG. 8, the MulteFire architecture 800 can include the IWK SCEF entity 816 is within the NHN core 801, connecting to one or more SCEF/MTC-IWF 814 located outside of the NHN 801 (i.e., the SCEF can be within the PSP domain). The IWF SCEF 816 can connect to the NH MME 806 using a T6 interface (such as a T6a interface), and to one or more SCEFs 814 using a T7 interface, such as T7-N interface or another type of T7 interface. The SCEFs 814 in turn connect to SCS/AS 820, as well as to HSS 822 coupled to 3GPP AAA server 812. Since the IWK SCEF 816 is the only SCEF-related entity within the NHN core 801, the security requirements may not be stringent and trust domain can be imposed on the T7 interface.

As seen in FIG. 8, the applications reside in PSP domain (e.g., SCS/AS 820 and 826). The SCEFs 814 can interface with the HSS 822 so that the SCEF can perform the following functions:

(a) SCEF 814 can query the HSS 822 to deliver trigger information and also map the device identity;

(b) SCEF 814 can inform the HSS 822 to deliver event monitoring information to NH MME 806 via the S6a interface; and (c) HSS 822 can send access point name (APN) and SCEF routing information to the NH MME 806 via the S6a interface during attach procedure.

In some aspects, the SCEF 814 can be configured to access the HSS functionality, which can be facilitated by enhancing the SWa/STa interface so that the SCEF 814 can interface with AAA (830 and 812) and HSS 822 in the PSP domain.

In some aspects, the IWK SCEF 816 can be configured to perform integration functions for the SCEF/MTC-IWK 814 (which can include multiple servers as illustrated in FIG. 8). The SCEF/MTC-IWF 814 can be configured to expose functionalities of the NHN 801 to one or more applications running on the SCS/AS 820. The SCEF/MTC-IWF 814 can be deployed outside a 3GPP PLAN and can be configured to exchange information with the PSP AAA 830, the subscriber database used by the PSP AAA (e.g. retrieve subscriber information), or the 3GPP AAA 812.

In some aspects, the IWK SCEF 816 can be configured to receive monitoring event reports from the underlying entities and send them to the SCEF 814. The IWK SCEF 816 can be configured to relay the non-IP data between the NH MME 806 and the SCEF 814. The functionality of the IWK SCEF 816 may also include the following functionalities: normalization of reports according to roaming agreement between VPLMN and HPLMN, e.g. change the location granularity of monitoring event reports received from the underlying entities, and generation of charging/accounting information. In connection with the generation of charging/accounting information, the IWK SCEF 816 can be configured to receive the monitoring configuration information as well as the monitoring event report from the underlying nodes, as well as receive the NIDD charging ID from the SCEF during a connection establishment procedure.

Figure 9:
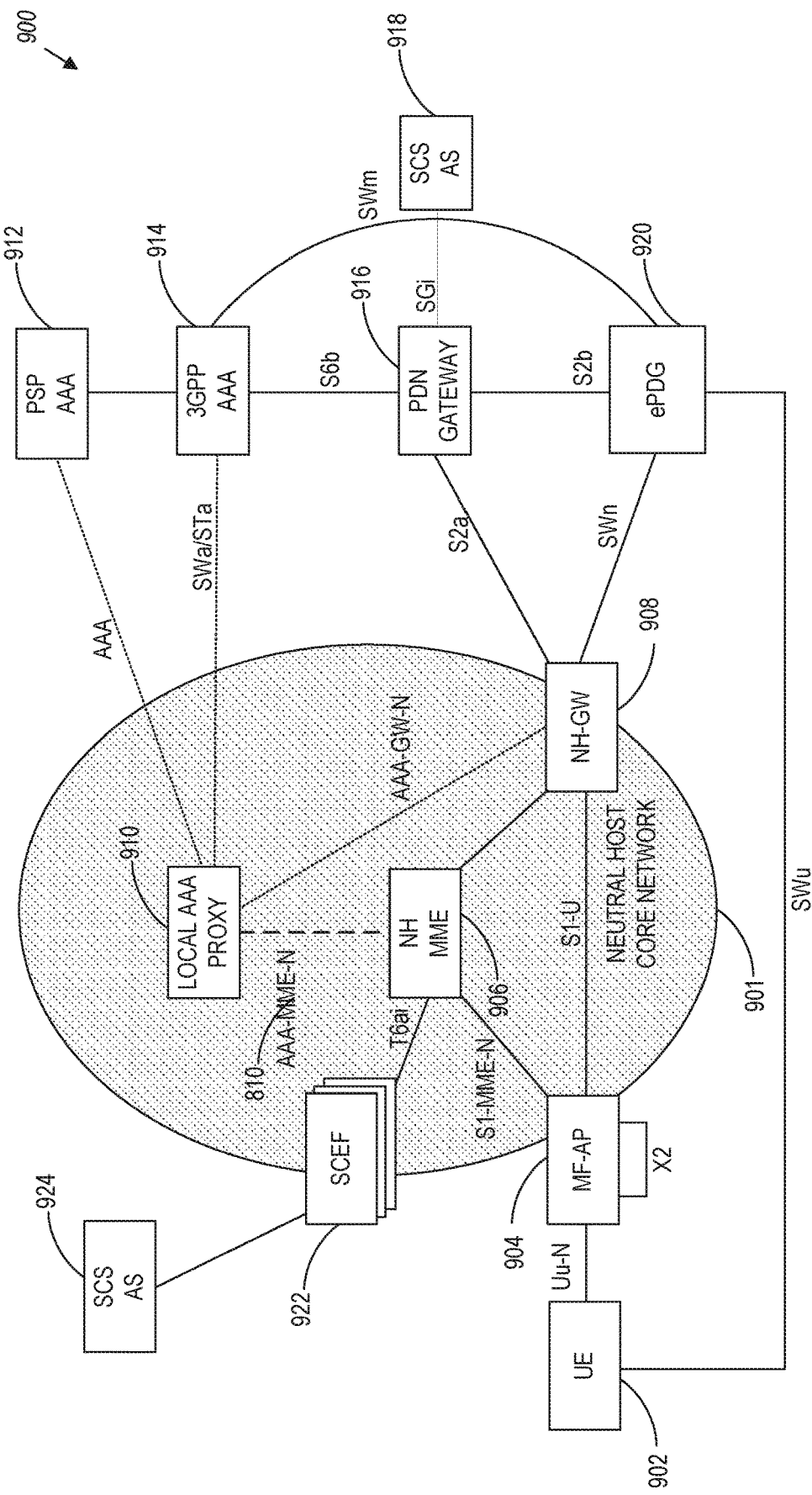
FIG. 9 is an illustration of a MulteFire architecture with an SCEF integrated in the NHN domain in accordance with some aspects.

In some aspects, the SCEF can be located within the NHN core, as further illustrated in FIG. 9. FIG. 9 is an illustration of a MulteFire architecture 900 with an SCEF integrated in the NHN domain in accordance with some aspects. Referring to FIG. 9, the MulteFire architecture 900 can include a ME UE 902 coupled to a ME AP 904. The MF AP 904 can access a NHN 901, which can include a NH MME 906, a NH GW 908, a local AAA proxy 910, and one or more SCEFs 922 coupled to SCS/AS 924. The AAA proxy 910 can be coupled to the PSP AAA server 912 and the 3GPP AAA server 914. The functionalities of elements 902, 904, 906, 908, and 910 can be similar to the above-described functionalities of corresponding elements 702, 704, 706, 708, and 710 (in FIG. 7), respectively.

The NH GW 908 within the NHN 901 can be used for providing connections to ePDG 920 as well as to a PDN GW 916 coupled to an SCS/AS 918.

As illustrated in FIG. 9, the SCEF 922 connects to the NH MME via the T6ai interface. The SCS/AS 924 can reside within the NHN core 901 or within the PSP network. In some aspects, the SCEF 922 can be configured to interface with an HSS (as illustrated in FIG. 8) and the HSS functionality can be added to the NHN 901 as well.

Figure 10:
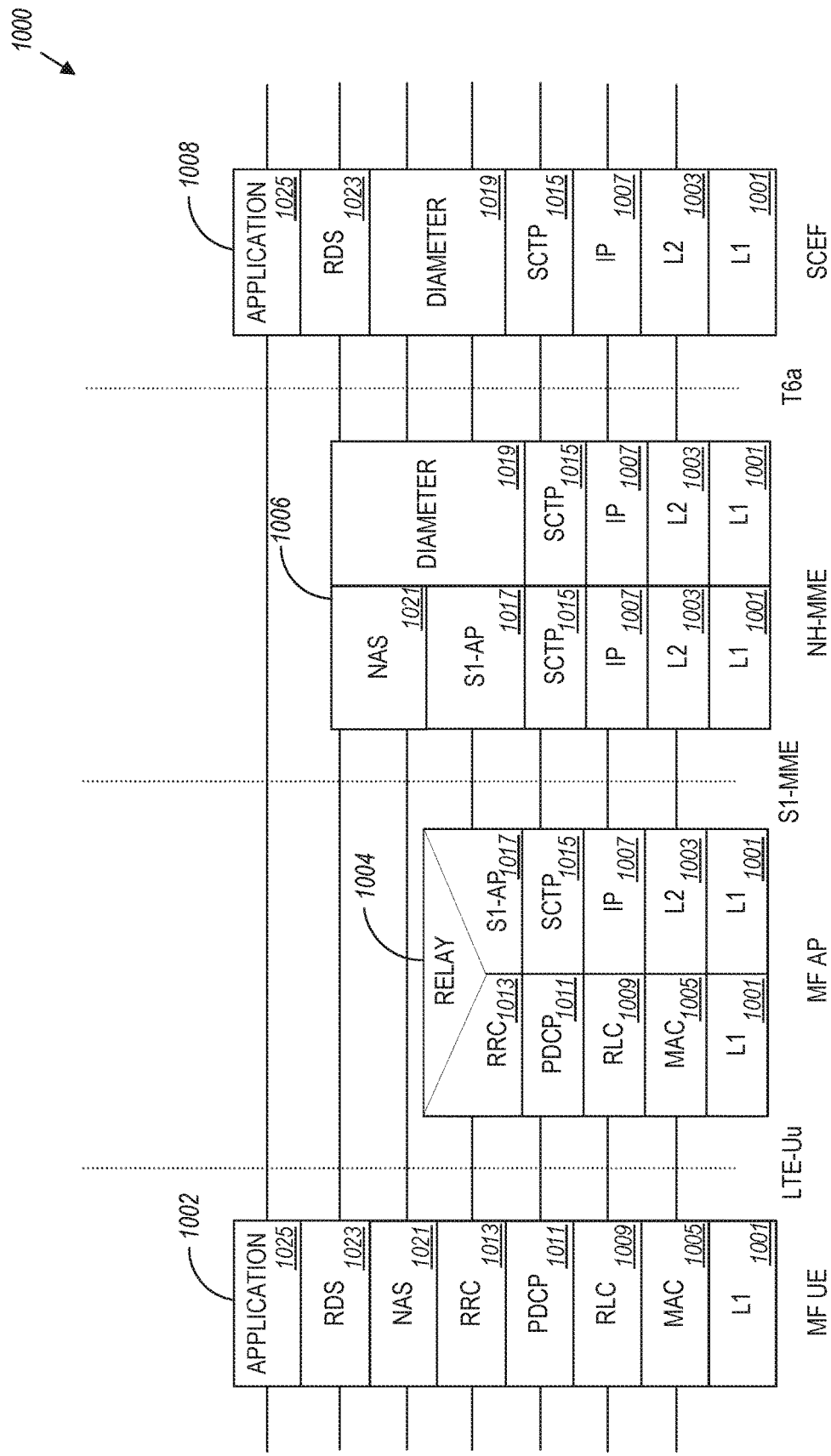
FIG. 10 illustrates protocol layering for a reliable data transfer between UE and a Service Capability Exposure Function (SCEF) in a MulteFire architecture, in accordance with some aspects.

FIG. 10 illustrates protocol layering 1000 for a reliable data transfer between UE and a Service Capability Exposure Function (SCEF) in a MulteFire architecture, in accordance with some aspects. Referring to FIG. 10, there is illustrated protocol layering 1000 for a reliable data service (RDS) protocol associated with communications between the MF UE 802 and the SCEF 814.

In some aspects, the RDS protocol can support peer-to-peer data transfers (e.g., acknowledged or unacknowledged), providing reliable data delivery between the UE and the SCEF. The data is transferred via a PDN connection between the MF UE 1002 and the SCEF 1006. In some aspects, a ME UE can connect to multiple SCEFs and can connect to multiple SCS/AS via the SCEFs. Additionally, the RDS protocol can support multiple applications on the UE to simultaneously conduct data transfers with their peer entities on the SCEF using a single PDN connection between the UE and the SCEF. In some aspects, the RDS protocol can be configured to support both acknowledged and unacknowledged data transfers in a MulteFire architecture, such as MulteFire architecture 800. In some aspects, the RDS protocol can be configured to support variable-length frames and shall allow detection and elimination of duplicate frames at the receiving endpoint.

As illustrated in FIG. 10, the protocol stack for the MF UE 1002 can include the following components: L1 layer 1001, MAC layer 1005, RLC layer 1009, PDCP layer 1011, RRC layer 1013, NAS layer 1021, RDS layer 1023, and application layer 1025. The protocol stack for the MF AP 1004 can include L1 layers 1001, an L2 layer 1003, a MAC layer 1005, an IP layer 1007, an RLC layer 1009, a PDCP layer 1011, an SCTP layer 1015, an RRC layer 1013, and S1-AP layer 1017.

The protocol stack for the NH MME 1006 can include L1 layers 1001, L2 layers 1003, IP layers 1007, SCTP layers 1015, an S1-AP layer 1017, a diameter layer 1019, and a NAS layer 1021.

The protocol stack for the SCEF 1008 can include an L1 layer 1001, an L2 layer 1003, an IP layer 1007, an SCTP layer 1015, a diameter layer 1019, an RDS layer 1023, and an application layer 1025. As illustrated in FIG. 10, in some aspects, the RDS protocol layer 1023 operates above the NAS layers 1021 and the diameter layers 1019. In other aspects, the RDS protocol layer, which can be used to add reliability in data communication/exchange (e.g., by adding acknowledgements) can be used on top of other protocol layers and in different configuration from the layer configuration illustrated in FIG. 10.

In some aspects, the RDS protocol can be used to establish a peer-to-peer logical link between the MF UE. 1002 and the SCEF 1008. The logical link can be identified by a pair of port number and an EPS bearer ID. Each port number can be used to identify an application on the MF UE side or the SCEF side, and can be included in a field (e.g., the address field) of one or more RDS frames.

In some aspects, the source port number identifies the application running on the originator device (e.g., the MF UE), and the destination port number identifies the application running on the receiver device (e.g., the SCEF).

In some aspects, an RDS frame can include a header and an information field of variable length. The header can include information about port numbers and the frame number that is used to identify the frame and provide reliable transmission. The information field can include the payload to be transferred between the ME UE and the SCEF.

In some aspects, the UE can be configured to establish a PDN connection with the SCEF either during an Attach procedure or through UE-requested PDN connectivity procedure. The MF UE can be configured to use the EPS bearer ID to select the bearers to transfer RDS PDUs to the SCEF. The EPS bearer ID can be used to identify the destination (at the MF UE or at the SCEF). In some aspects, the EPS bearer ID can be omitted from an RDS frame and can be included in a NAS ESM message header. For example, the EPS bearer ID can be included as part of an ESM data transport message used for sending data over the control plane.

In some aspects, the RDS protocol can be configured to support multiple UEs at the LTE-Uu interface and multiple applications within the UE. The RDS protocol can be configured to provide functionality for flow control and sequence control to maintain the sequential order of frames across the logical link.

In some aspects, the RDS protocol can be used for acknowledged as well as unacknowledged data transfer and communication between the MF UE and the SCEF. In some aspects, during acknowledged operation, the information can be transmitted in order in numbered Information (I) frames. The I frames can be acknowledged at the RDS layer. In some aspects, error recovery and reordering mechanisms based on retransmission of acknowledged I frames can be provided by the RDS protocol. For example, several I frames can be acknowledged at the same time. In some aspects, flow control can be implemented via a sliding window mechanism. The procedure for establishment of acknowledged transfer is described herein below.

In some aspects, during unacknowledged operation, the information can be transmitted in numbered Unconfirmed Information (UI) frames. In some aspects, the UI frames are not acknowledged at the RDS layer. In some aspects, error recovery and reordering mechanisms can be undefined for UI frame communication. In some aspects, duplicate UI frames can be discarded.

In some aspects and in reference to FIG. 8, the MF UE 802 can perform an attach procedure in order to attach to the NH and 801. As part of the attach procedure, a PDN connection can be created to the SCEF 814, and the RDS protocol can be used for non-IP data delivery (NIDD) between the ME UE 802 and the SCEF 814. More specifically, data can be delivered from the MF UE 802 to the MF AP 804 to the NH MME 806 to the IWK SCEF 816 to the SCEF 814. Data including acknowledgments can be sent back to the MF UE 802 from one or more applications running on the SCS/AS 820 via the SCEF 814 and the IWK SCEF 816.

In some aspects and in reference to FIG. 8, triggering and monitoring functions can be performed within the MulteFire architecture 800. More specifically, the SCEF 814 can query the HSS 822 to deliver trigger information and/or to map a device identity. The SCEF 814 can also inform the HSS 822 two deliver event monitoring information to the NH MME 806. After SCEF 814 obtain subscription information and device identity information for the ME UE 802, the SCEF 814 can deliver trigger information to the LIE 802, where the trigger information can originate from the SCS/AS 820. The MF UE 802 can perform one or more application specific actions in response to the device trigger information received from the SCEF 814.

Figure 11:
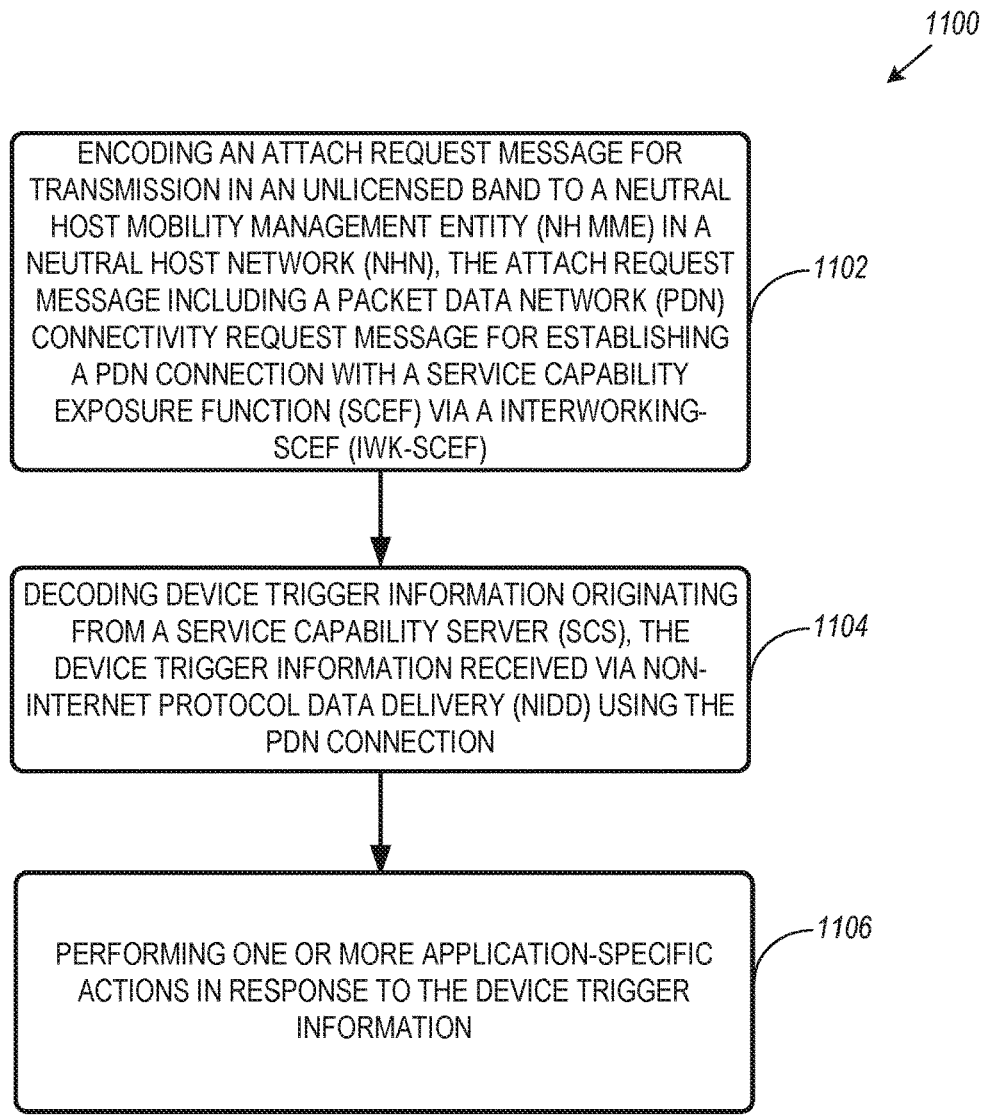
FIG. 11 illustrates generally a flowchart of an example method of operating a MulteFire UE (MF UE) within a MulteFire architecture with an SCEF, in accordance with some aspects.

FIG. 11 illustrates generally a flowchart of an example method 1100 of operating a MulteFire UE (MF UE) within a MulteFire architecture with an SCEF, in accordance with some aspects. Referring to FIG. 11, the example method 1100 can start at operation 1102, when an Attach Request message can be encoded for transmission in an unlicensed band to a Neutral Host Mobility Management Entity (e.g., NH MME 806) in a Neutral Host Network (e.g., NHN 801). The Attach Request message can include a Packet Data Network (PDN) Connectivity Request message for establishing a PDN connection with a Service Capability Exposure Function (e.g., SCEF 814) via a Interworking-SCEF (e.g., IWK-SCEF 816).

At operation 1104, device trigger information originating from a Service Capability Server (e.g., SCS/AS 820) can be decoded. The device trigger information can be received via non-Internet Protocol data delivery (NIDD) using the PDN connection (e.g., using an RDS protocol). At operation 1106, one or more application-specific actions can be performed in response to the device trigger information.

Figure 12:
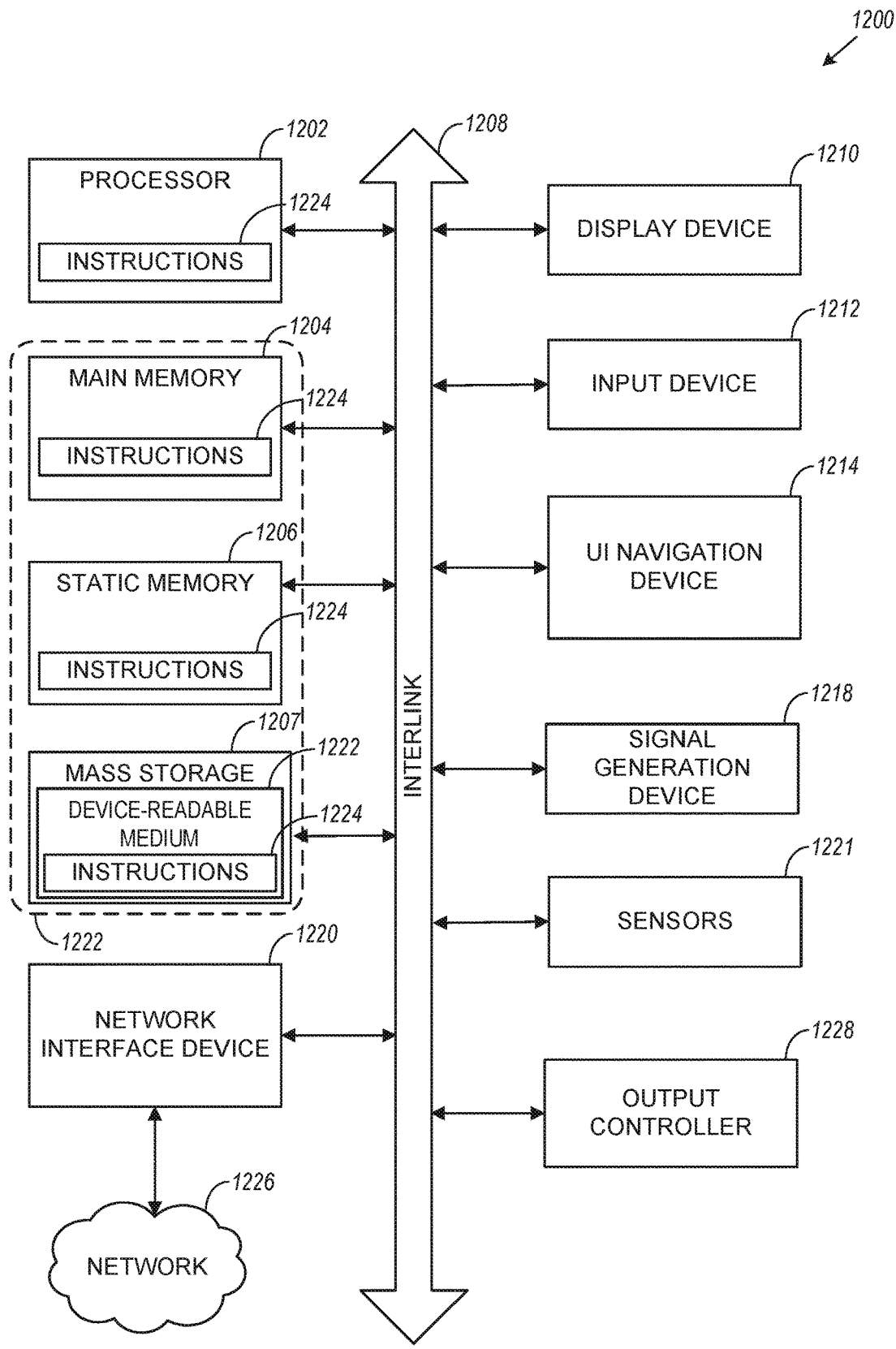
FIG. 12 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 12 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 1200 may operate as a standalone device or may be connected (e.g., networked) to other communication devices.

Circuitry (e.g., processing circuitry) is a collection of circuits implemented in tangible entities of the device 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to catty out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1200 follow.

In some aspects, the device 1200 may operate as a standalone device or may be connected (e.g., networked) to other devices. In a networked deployment, the communication device 1200 may operate in the capacity of a server communication device, a client communication device, or both in server-client network environments. In an example, the communication device 1200 may act as a peer communication device in peer-to-peer (P2P) (or other distributed) network environment. The communication device 1200 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1200 may include a hardware processor 1202 (e.g., a central processing unit (CPU), a graphics processing unit (GPU), a hardware processor core, or any combination thereof), a main memory 1204, a static memory 1206, and mass storage 1207 (e.g., hard drive, tape drive, flash storage, or other block or storage devices), some or all of which may communicate with each other via an interlink (e.g., bus) 1208.

The communication device 1200 may further include a display device 1210, an alphanumeric input device 1212 (e.g., a keyboard), and a user interface (UI) navigation device 1214 (e.g., a mouse). In an example, the display device 1210, input device 1212 and UI navigation device 1214 may be a touch screen display. The communication device 1200 may additionally include a signal generation device 1218 (e.g., a speaker), a network interface device 1220, and one or more sensors 1221, such as a global positioning system (GPS) sensor, compass, accelerometer, or other sensor. The communication device 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1207 may include a communication device-readable medium 1222, on which is stored one or more sets of data structures or instructions 1224 (e.g., software) embodying or utilized by any one or more of the techniques or functions described herein. In some aspects, registers of the processor 1202, the main memory 1204, the static memory 1206, and/or the mass storage 1207 may be, or include (completely or at least partially), the device-readable medium 1222, on which is stored the one or more sets of data structures or instructions 1224, embodying or utilized by any one or more of the techniques or functions described herein. In an example, one or any combination of the hardware processor 1202, the main memory 1204, the static memory 1206, or the mass storage 1216 may constitute the device-readable medium 1222.

As used herein, the term "device-readable medium" is interchangeable with "computer-readable medium" or "machine-readable medium". While the communication device-readable medium 1222 is illustrated as a single medium, the term "communication device-readable medium" may include a single medium or multiple media (e.g., a centralized or distributed database, and/or associated caches and servers) configured to store the one or more instructions 1224.

The term "communication device-readable medium" may include any medium that is capable of storing, encoding, or carrying instructions (e.g., instructions 1224) for execution by the communication device 1200 and that cause the communication device 1200 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), MIMO, or multiple-input single-output (MISO) techniques. In some examples, the network interface device 1220 may wirelessly communicate using Multiple User MIMO techniques.

The term "transmission medium" shall be taken to include any intangible medium that is capable of storing, encoding or carrying instructions for execution by the communication device 1200, and includes digital or analog communications signals or other intangible medium to facilitate communication of such software. In this regard, a transmission medium in the context of this disclosure is a device-readable medium.

ADDITIONAL NOTES AND EXAMPLES

Example 1 is an apparatus of a MulteFire (MF) user equipment (ME UE), the apparatus comprising: processing circuitry, the processing circuitry to configure the MF UE to implement a Reliable Data Service (RDS) protocol, wherein to implement the RDS protocol, the processing circuitry is configured to: encode an Attach Request message for transmission in an unlicensed band to a Neutral Host Mobility Management Entity (NH MME) in a Neutral Host Network (NHN), the Attach Request message including a Packet Data Network (PDN) Connectivity Request message for establishing a PDN connection with a Service Capability Exposure Function (SCEF) via a Interworking-SCEF (IWK-SCEF); decode a configuration message from the SCEF, the configuration message indicating acceptance of non-Internet Protocol (IP) data communication via the PDN connection, using the RDS protocol; and in response to the configuration message, encode an RDS frame for transmission to the SCEF via the IWK-SCEF using the PDN connection in the unlicensed band; and memory coupled to the processing circuitry, the memory configured to store the PDN Connectivity Request message.

In Example 2, the subject matter of Example 1 includes, wherein the Attach Request message includes an indicator that the PDN connection is associated with non-IP data communication.

In Example 3, the subject matter of Examples 1-2 includes, wherein the IWK-SCEF is within the NHN and the SCEF is within a Participating Service Provider (PSP) network outside of the NHN.

In Example 4, the subject matter of Examples 1-3 includes, wherein the IWK-SCEF interfaces with the SCEF via a T7-N interface.

In Example 5, the subject matter of Examples 1-4 includes, wherein the IWK-SCEF interfaces with the NH MME within the NHN via a T6a interface.

In Example 6, the subject matter of Examples 1-5 includes, wherein the Attach Request message includes an indicator that the PDN connection is associated with device trigger delivery via non-IP data delivery (NIDD).

In Example 7, the subject matter of Example 6 includes, wherein the processing circuitry is further configured to: decode device trigger information originating from a Service Capability Server (SCS), the device trigger information received via the NIDD; and perform one or more application-specific actions in response to the device trigger information.

In Example 8, the subject matter of Examples 1-7 includes, wherein the processing circuitry is further configured to: encode a non-IP data packet for non-IP data delivery to an application server via a Neutral Host Gateway (NH-GW) within the NHN.

In Example 9, the subject matter of Example 8 includes, wherein the non-IP data packet is delivered to the application server via an SGi tunnel.

In Example 10, the subject matter of Examples 1-9 includes, wherein the SCEF is within the NHN.

In Example 11, the subject matter of Examples 1-10 includes, wherein the IWK-SCEF is configured to aggregate one or more monitoring reports associated with the MF UE, for communication to the SCEF.

In Example 12, the subject matter of Examples 1-11 includes, transceiver circuitry coupled to the processing circuitry; and, one or more antennas coupled to the transceiver circuitry.

Example 13 is a computer-readable storage medium that stores instructions for execution by one or more processors of a MulteFire (MF) user equipment (MF UE), the instructions to configure the one or more processors to cause the ME UE to: encode an Attach Request message for transmission in an unlicensed band to a Neutral Host Mobility Management Entity (NH MME) in a Neutral Host Network (NHN), the Attach Request message including a Packet Data Network (PDN) Connectivity Request message for establishing a PDN connection with a Service Capability Exposure Function (SCEF) via a Interworking-SCEF (IWK-SCEF); decode device trigger information originating from a Service Capability Server (SCS), the device trigger information received via non-Internet Protocol data delivery (NIDD) using the PDN connection; and perform one or more application-specific actions in response to the device trigger information.

In Example 14, the subject matter of Example 13 includes, wherein the PDN Connectivity Request message includes an indicator that the PDN connection is associated with non-IP data delivery (NIDD).

In Example 15, the subject matter of Examples 13-14 includes, wherein the IWK-SCEF is within the NHN and the SCEF is within a Participating Service Provider (PSP) network outside of the NHN.

In Example 16, the subject matter of Examples 13-15 includes, wherein the IWK-SCEF interfaces with the SCEF via a T7-N interface.

In Example 17, the subject matter of Examples 13-16 includes, wherein the IWK-SCEF interfaces with the NH MME within the NHN via a T6a interface.

Example 18 is an apparatus of a MulteFire user equipment (MF UE), the apparatus comprising: means for encoding an Attach Request message for transmission in an unlicensed band to a Neutral Host Mobility Management Entity (NH MME) in a Neutral Host Network (NHN), the Attach Request message including a Packet Data Network (PDN) Connectivity Request message for establishing a PDN connection with a Service Capability Exposure Function (SCEF) via a Interworking-SCEF (IWK-SCEF); means for decoding device trigger information originating from a Service Capability Server (SCS), the device trigger information received via non-Internet Protocol data delivery (NIDD) using the PDN connection; and means for performing one or more application-specific actions in response to the device trigger information.

In Example 19, the subject matter of Example 18 includes, wherein the PDN Connectivity Request message includes an indicator that the PDN connection is associated with non-IP data delivery (NIDD).

In Example 20, the subject matter of Examples 18-19 includes, wherein the IWK-SCEF is within the NHN and the SCEF is within a Participating Service Provider (PSP) network outside of the NHN.

In Example 21, the subject matter of Examples 18-20 includes, wherein the IWK-SCEF interfaces with the SCEF via a T7-N interface.

In Example 22, the subject matter of Examples 18-21 includes, wherein the IWK-SCEF interfaces with the NH MME within the NHN via a T6a interface.

Example 23 is a computer-readable storage medium that stores instructions for execution by one or more processors of a Service Capability Exposure Function (SCEF) node, the SCEF interfacing with an Interworking-SCEF (IWK-SCEF) within a Neutral Host Network (NHN), the instructions to configure the one or more processors to cause the SCEF node to: decode a Packet Data Network (PDN) Connectivity Request message for establishing a PDN connection with a MulteFire user equipment (MF UE) in an unlicensed band, the connectivity request message received from a Neutral Host Mobility Management Entity (NH MME) in the NHN via the IWK-SCEF; encode a configuration message for transmission to the MF UE via the IWK-SCEF, the configuration message indicating acceptance of non-Internet Protocol (IP) data communication via the PDN connection, using a Reliable Data Service (RDS) protocol; and decode an RDS frame received from the ME UE via the IWK-SCEF and using the PDN connection in the unlicensed band.

In Example 24, the subject matter of Example 23 includes, wherein the PDN Connectivity Request message includes an indicator that the PDN connection is associated with non-IP data delivery (NIDD).

In Example 25, the subject matter of Examples 23-24 includes, wherein the IWK-SCEF interfaces with the SCEF via a T7-N interface.

In Example 26, the subject matter of Examples 23-25 includes, wherein the instructions to configure the one or more processors further to cause the SCEF node to: decode a configuration message including an indicator that the PDN connection is associated with device trigger delivery via non-IP data delivery (NIDD).

In Example 27, the subject matter of Example 26 includes, wherein the instructions to configure the one or more processors further to cause the SCEF node to: encode device trigger information originating from a Service Capability Server (SCS), the device trigger information for transmission to the MF UE via the NIDD, the device trigger information for triggering the MF UE to perform one or more application-specific actions in response to the device trigger information.

In Example 28, the subject matter of Example 27 includes, wherein the instructions to configure the one or more processors further to cause the SCEF node to: encode a configuration message for transmission to a Home Subscriber Server (HSS), the configuration message to query the HSS for device identity of the MF UE prior to delivery of the device trigger information.

In Example 29, the subject matter of Examples 23-28 includes, wherein the instructions to configure the one or more processors further to cause the SCEF node to: decode one or more monitoring reports aggregated by the IWK-SCEF, the one or more monitoring reports associated with the MF UE.

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29.

Example 33 is a method to implement of any of Examples 1-29.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus of a MulteFire (MF) user equipment (MF UE), the apparatus comprising:
   at least one processor, the at least one processor to configure the MF UE to implement a Reliable Data Service (RDS) protocol, wherein to implement the RDS protocol, the at least one processor is configured to:
     encode an Attach Request message for transmission in an unlicensed band to a Neutral Host Mobility Management Entity (NH MME) in a Neutral Host Network (NHN), the Attach Request message including a Packet Data Network (PDN) Connectivity Request message for establishing a PDN connection with a Service Capability Exposure Function (SCEF) via a Interworking-SCEF (IWK-SCEF);
     decode a configuration message from the SCEF, the configuration message indicating acceptance of non-Internet Protocol (IP) data communication via the PDN connection, using the RDS protocol; and
     in response to the configuration message, encode an RDS frame for transmission to the SCEF via the IWK-SCEF using the PDN connection in the unlicensed band.

2. The apparatus of claim 1, wherein the Attach Request message includes an indicator that the PDN connection is associated with non-IP data communication.

3. The apparatus of claim 1, wherein the IWK-SCEF is within the NHN and the SCEF is within a Participating Service Provider (PSP) network outside of the NHN.

4. The apparatus of claim 1, wherein the IWK-SCEF interfaces with the SCEF via a T7-N interface.

5. The apparatus of claim 1, wherein the IWK-SCEF interfaces with the NHN MME within the NHN via a T6a interface.

6. The apparatus of claim 1, wherein the Attach Request message includes an indicator that the PDN connection is associated with device trigger delivery via non-IP data delivery (NIDD).

7. The apparatus of claim 6, wherein the at least one processor is further configured to:
   decode device trigger information originating from a Service Capability Server (SCS), the device trigger information received via the NIDD; and perform one or more application-specific actions in response to the device trigger information.

8. The apparatus of claim 1, wherein the at least one processor is further configured to:
encode a non-IP data packet for non-IP data delivery to an application server via a Neutral Host Gateway (NH-GW) within the NHN.

9. The apparatus of claim 8, wherein the non-IP data packet is delivered to the application server via an SGi tunnel.

10. The apparatus of claim 1, wherein the SCEF is within the NHN.

11. The apparatus of claim 1, wherein the IWK-SCEF is configured to aggregate one or more monitoring reports associated with the MF UE, for communication to the SCEF.

12. A non-transitory computer-readable storage medium that stores instructions for execution by one or more processors of a Service Capability Exposure Function (SCEF) node, the SCEF interfacing with an Interworking-SCEF (IWK-SCEF) within a Neutral Host Network (NHN), the instructions to configure the one or more processors to cause the SCEF node to:
decode a Packet Data Network (PDN) Connectivity Request message for establishing a PDN connection with a MulteFire user equipment (MF UE) in an unlicensed band, the connectivity request message received from a Neutral Host Mobility Management Entity (NH MME) in the NHN via the IWK-SCEF;
encode a configuration message for transmission to the MF UE via the IWK-SCEF, the configuration message indicating acceptance of non-Internet Protocol (IP) data communication via the PDN connection, using a Reliable Data Service (RDS) protocol; and
decode an RDS frame received from the MF UE via the IWK-SCEF and using the PDN connection in the unlicensed band.

13. The non-transitory computer-readable storage medium of claim 12, wherein the PDN Connectivity Request message includes an indicator that the PDN connection is associated with non-IP data delivery (NIDD).

14. The non-transitory computer-readable storage medium of claim 12, wherein the IWK-SCEF interfaces with the SCEF via a T7-N interface.

15. A non-transitory computer-readable storage medium that stores instructions for execution by one or more processors of a MulteFire (MF) user equipment (MF UE) to implement a Reliable Data Service (RDS) protocol, wherein to implement the RDS protocol, the instructions to configure the one or more processors to cause the MF UE to:
encode an Attach Request message for transmission in an unlicensed band to a Neutral Host Mobility Management Entity (NH MME) in a Neutral Host Network (NHN), the Attach Request message including a Packet Data Network (PDN) Connectivity Request message for establishing a PDN connection with a Service Capability Exposure Function (SCEF) via a Interworking-SCEF (IWK-SCEF);
decode a configuration message from the SCEF, the configuration message indicating acceptance of non-Internet Protocol (IP) data communication via the PDN connection, using the RDS protocol; and
in response to the configuration message, encode an RDS frame for transmission to the SCEF via the IWK-SCEF using the PDN connection in the unlicensed band.

16. The non-transitory computer-readable storage medium of claim 15, wherein the Attach Request message includes an indicator that the PDN connection is associated with non-IP data communication.

17. The non-transitory computer-readable storage medium of claim 15, wherein the Attach Request message includes an indicator that the PDN connection is associated with device trigger delivery via non-IP data delivery (NIDD).

18. The non-transitory computer-readable storage medium of claim 15, wherein the instructions are further executable to:
decode device trigger information originating from a Service Capability Server (SCS), the device trigger information received via the NIDD; and
perform one or more application-specific actions in response to the device trigger information.

19. The non-transitory computer-readable storage medium of claim 15, wherein the instructions are further executable to:
encode a non-IP data packet for non-IP data delivery to an application server via a Neutral Host Gateway (NH-GW) within the NHN.

20. The non-transitory computer-readable storage medium of claim 15, wherein the IWK-SCEF is configured to aggregate one or more monitoring reports associated with the MF UE, for communication to the SCEF.

* * * * *